(12) United States Patent
Kim et al.

(10) Patent No.: US 12,061,495 B2
(45) Date of Patent: Aug. 13, 2024

(54) ELECTRONIC DEVICE AND AN IMAGE PROCESSING METHOD OF THE SAME

(71) Applicant: Samsung Display Co., Ltd., Yongin-Si (KR)

(72) Inventors: Hyosun Kim, Seongnam-si (KR); Sungchan Jo, Seoul (KR); Joosun Choi, Seongnam-si (KR); Hayoung Lee, Seoul (KR); Unbyoll Ko, Hwaseong-si (KR); Jaejoong Kwon, Suwon-si (KR); Young-Jun Seo, Suwon-si (KR); Eunjung Lee, Yongin-si (KR); Ja Eun Lee, Suwon-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/987,423

(22) Filed: Nov. 15, 2022

(65) Prior Publication Data

US 2023/0176610 A1 Jun. 8, 2023

(30) Foreign Application Priority Data

Dec. 7, 2021 (KR) .......................... 10-2021-0173895

(51) Int. Cl.
*G06F 1/16* (2006.01)
*G06F 1/18* (2006.01)
(Continued)

(52) U.S. Cl.
CPC ............ *G06F 1/1605* (2013.01); *G06F 1/183* (2013.01); *G06T 5/50* (2013.01); *G06T 5/77* (2024.01); *G09G 3/007* (2013.01); *G09G 3/2074* (2013.01)

(58) Field of Classification Search
CPC ....... G06F 1/1605; G06F 1/183; G06T 5/005; G06T 5/50; G09G 3/007; G09G 3/2074
See application file for complete search history.

(56) References Cited

U.S. PATENT DOCUMENTS 8,576,325 B2 11/2013 Dudek et al.
9,148,588 B2 9/2015 Jung et al.
(Continued)

FOREIGN PATENT DOCUMENTS

KR 10-1954192 3/2019
KR 10-2023179 9/2019
(Continued)

OTHER PUBLICATIONS

Yuqian Zhou et al., "Image Restoration for Under-Display Camera", arXiv preprint arXiv:2003.04857, Mar. 2021, pp. 1-13.
(Continued)

*Primary Examiner* — Adam R. Giesy
(74) *Attorney, Agent, or Firm* — F. CHAU & ASSOCIATES, LLC

(57) ABSTRACT

An electronic device includes: a display panel including a display area and a peripheral area adjacent to the display area; and an electro-optical module adjacent to the display panel, wherein the display area includes a first area and a second area adjacent to the first area, and wherein the electro-optical module includes a plurality of camera modules, and each of the plurality of camera modules receives an optical signal passing through the first area.

22 Claims, 26 Drawing Sheets

(51) Int. Cl.
*G06T 5/50* (2006.01)
*G06T 5/77* (2024.01)
*G09G 3/00* (2006.01)
*G09G 3/20* (2006.01)

(56) References Cited

U.S. PATENT DOCUMENTS

| | | |
|---|---|---|
| 9,253,397 B2 | 2/2016 | Lee et al. |
| 9,451,173 B2 | 9/2016 | Kang et al. |
| 9,639,153 B2 | 5/2017 | Lim et al. |
| 2020/0176657 A1* | 6/2020 | Jang .................. G06F 1/1626 |
| 2020/0410921 A1 | 12/2020 | Kim et al. |

FOREIGN PATENT DOCUMENTS

| | | |
|---|---|---|
| KR | 10-2149187 | 8/2020 |
| KR | 10-2179154 | 11/2020 |
| KR | 10-2021-0002171 | 1/2021 |

OTHER PUBLICATIONS

Zhenhua Zhang, "Image Deblurring of Camera Under Display by Deep Learning", SID International Symposium Digest of Technical Papers (vol. 51, Issue S1), Jul. 2020, pp. 43-46.

* cited by examiner

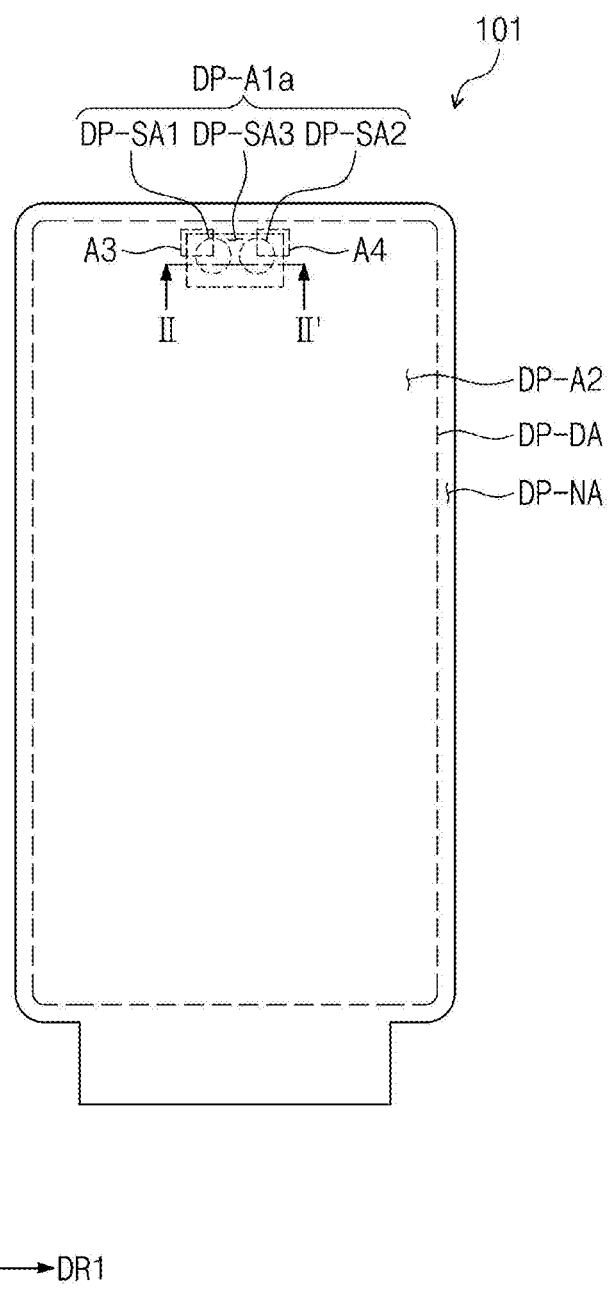

IM1a

IM2a

ELECTRONIC DEVICE AND AN IMAGE PROCESSING METHOD OF THE SAME

CROSS-REFERENCE TO RELATED APPLICATION

This application claims priority under 35 U.S.C. § 119 to Korean Patent Application No. 10-2021-0173895 filed on Dec. 7, 2021, in the Korean Intellectual Property Office, the disclosure of which is incorporated by reference herein in its entirety.

Technical Field

Embodiments of the present disclosure relate to an electronic device and an image processing method thereof and more particularly, to an electronic device having a capturing a function, and an image processing method thereof.

Discussion of Related Art

A display device is an output device for presentation of information in visual form. The display device may be composed of various electronic components such as a display module for displaying an image and an electro-optical module. The electronic components may be electrically connected to each other by signal lines having various arrangements. The electro-optical module may include a camera, an infrared sensor, a proximity sensor, and the like.

The electro-optical module may be disposed under the display module. The display module may include an active area where an image is displayed and a peripheral area adjacent to the active area. The peripheral area may surround the active area or be disposed on fewer than all sides of the active area. The electro-optical module may be disposed under the peripheral area.

SUMMARY

Embodiments of the present disclosure provide an electronic device that generates a final image with increased image quality by providing a plurality of camera modules under a display area of the electronic device, and an image processing method thereof.

According to an embodiment of the present disclosure, an electronic device includes: a display panel including a display area and a peripheral area adjacent to the display area; and an electro-optical module adjacent to the display panel, wherein the display area includes a first area and a second area adjacent to the first area, and wherein the electro-optical module includes a plurality of camera modules, and each of the plurality of camera modules receives an optical signal passing through the first area.

According to an embodiment of the present disclosure, an electronic device includes: a display panel including a display area and a peripheral area adjacent to the display area; and an electro-optical module disposed under the display panel, wherein the display area includes a first area and a second area adjacent to the first area, and wherein the electro-optical module includes a camera module overlapping the first area and configured to receive an optical signal passing through the first area, and wherein the camera module includes: an image sensor; and a plurality of optical modules overlapping the image sensor.

According to an embodiment of the present disclosure, an image processing method of an electronic device including a display panel, which includes a display area including a first area and a second area adjacent to the first area and a peripheral area adjacent to the display area, and a plurality of camera modules overlapping the first area, the method including: generating, by the plurality of camera modules, pieces of image data by receiving an optical signal passing through the first area; and receiving pieces of image data from the plurality of camera modules through an image processor, respectively and generating final image data by processing the pieces of image data.

According to an embodiment of the present disclosure, an electronic device includes: a display panel including a display area, wherein the display area includes a first area and a second area adjacent to the first area; and a camera module disposed under the display panel and overlapped by the first area to receive an optical signal passing through the first area.

BRIEF DESCRIPTION OF THE FIGURES

The above and other features of the present disclosure will become apparent by describing in detail embodiments thereof with reference to the accompanying drawings.

FIG. 7 is a plan view of a display panel, according to an embodiment of the present disclosure.

DETAILED DESCRIPTION OF THE EMBODIMENTS

Figure 1:
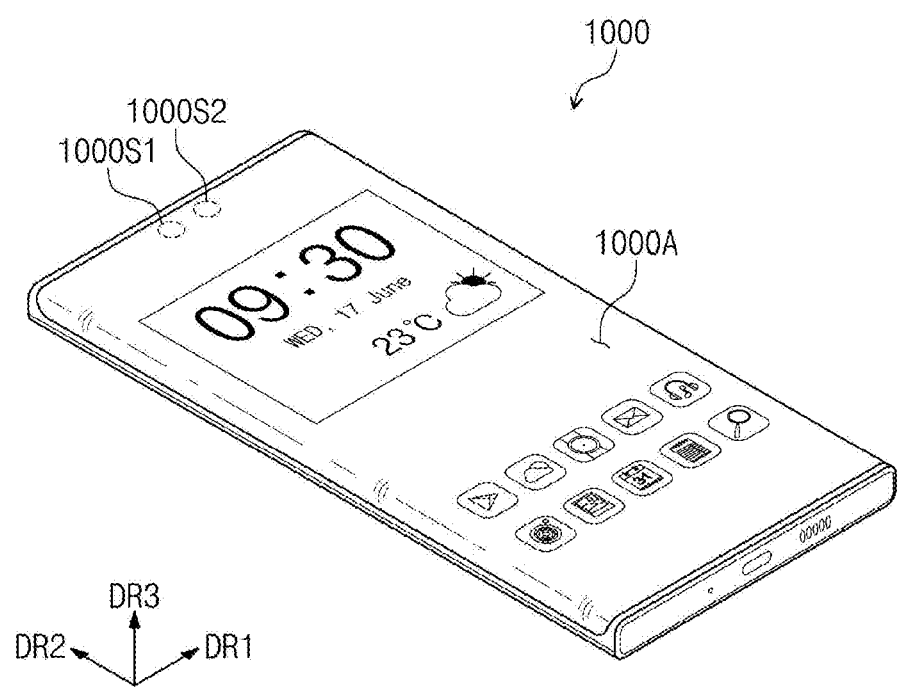
FIG. 1 is a perspective view of an electronic device, according to an embodiment of the present disclosure.

In the specification, the expression that a first component (or region, layer, part, portion, etc.) is "on", "connected with", or "coupled with" a second component may mean that the first component is directly on, connected with, or coupled with the second component or that a third component is interposed therebetween.

The same reference numerals may refer to the same components throughout the specification. In addition, in drawings, the thickness, ratio, and dimension of components may be exaggerated. The expression "and/or" may include one or more combinations of associated components.

Although the terms "first", "second", etc. may be used to describe various components, the components should not be construed as being limited by these terms. These terms are used to distinguish one component from another component. For example, a first component may be referred to as a second component, and similarly, the second component may be referred to as the first component. The articles "a," "an," and "the" are singular in that they have a single referent, but the use of the singular form in the specification should not preclude the presence of more than one referent.

In addition, the terms "under", "below", "on", "above", etc. may be used to describe the correlation of components illustrated in drawings. The terms are described based on a direction shown in drawings.

It will be understood that the terms "include", "comprise", "have", etc. specify the presence of features, numbers, steps, operations, elements, or components, described in the specification, or a combination thereof, but do not preclude the presence or possibility of one or more other features, numbers, steps, operations, elements, components or a combination thereof.

Unless otherwise defined, all terms (including technical terms and scientific terms) used in the specification have the same meaning as commonly understood by one skilled in the art to which the present disclosure belongs. Furthermore, terms such as those defined in dictionaries commonly used should be interpreted as having a meaning consistent with their meaning in the context of the related technology, and should not be interpreted in an ideal or overly formal meaning unless explicitly defined herein.

Hereinafter, embodiments of the present disclosure will be described with reference to the accompanying drawings.

FIG. 1 is a perspective view of an electronic device, according to an embodiment of the present disclosure.

Referring to FIG. 1, an electronic device 1000 may be a device activated in response to an electrical signal. For example, the electronic device 1000 may be a mobile phone, a tablet, a monitor, a television, a car navigation system, a game console, or a wearable device, but is not limited thereto. FIG. 1 illustrates that the electronic device 1000 is a cellular phone.

The electronic device 1000 may display an image through a display area 1000A. The display area 1000A may include a plane formed by a first direction DR1 and a second direction DR2. The display area 1000A may further include curved surfaces, each of which is bent from at least two sides of the plane. However, the shape of the display area 1000A is not limited thereto. For example, the display area 1000A may include only the plane and not the curved surfaces. The display area 1000A may further include at least two or more (e.g., four) curved surfaces of the plane, which are respectively bent from four sides of the plane.

A plurality of sensing areas 1000S1 and 1000S2 may be provided in the display area 1000A of the electronic device 1000. The two sensing areas (e.g., the first and second sensing areas 1000S1 and 1000S2) are illustrated in FIG. 1 as an example. However, the number of sensing areas 1000S1 and 1000S2 is not limited thereto. The first and second sensing areas 1000S1 and 1000S2 may be a part of the display area 1000A. Accordingly, the electronic device 1000 may display an image through the first and second sensing areas 1000S1 and 1000S2.

An electro-optical module may be positioned in each of the first and second sensing areas 1000S1 and 1000S2. The electro-optical module may include a plurality of camera modules (e.g., a first camera module CM1 (see FIG. 2) and a second camera module CM2 (see FIG. 2)). The electro-optical module may receive external inputs (e.g., an optical signal or the like) through the first and second sensing areas 1000S1 and 1000S2. The electronic device 1000 may further include a sensing area where a sensor for measuring a distance, such as a proximity sensor, and a sensor for recognizing a part of a user's body (e.g., a fingerprint, an iris, or a face) are positioned.

A thickness direction of the electronic device 1000 may be parallel to a third direction DR3 intersecting the first direction DR1 and the second direction DR2. Accordingly, front surfaces (or upper surfaces) and back surfaces (or lower surfaces) of members constituting the electronic device 1000 may be described with respect to the third direction DR3.

Figure 2:
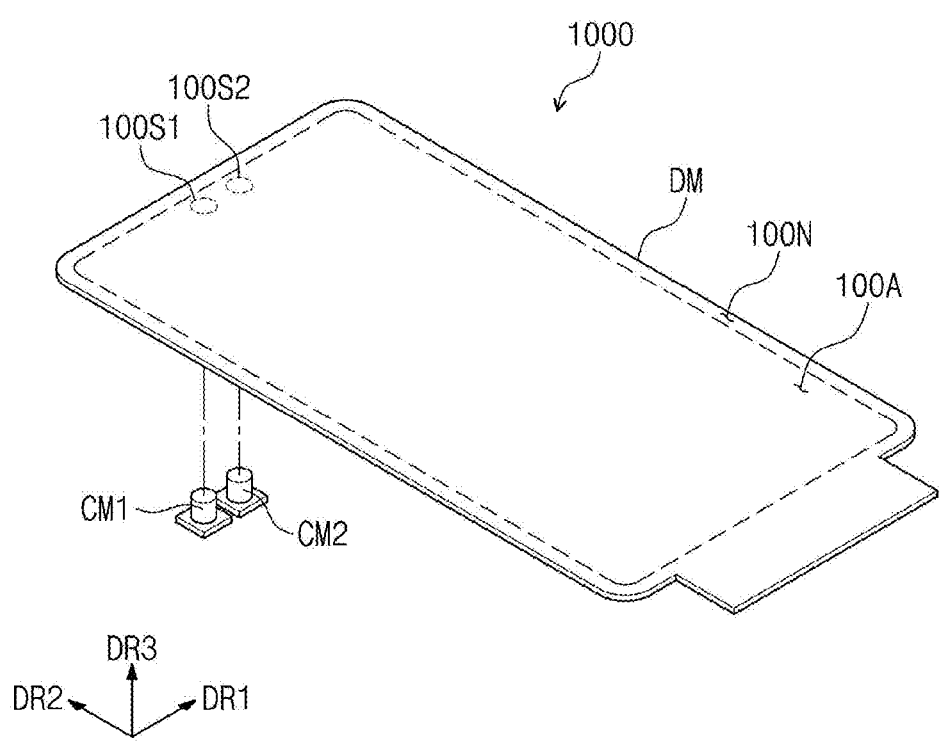
FIG. 2 is an exploded perspective view illustrating a configuration of an electronic device, according to an embodiment of the present disclosure.

FIG. 2 is an exploded perspective view illustrating a configuration of an electronic device, according to an embodiment of the present disclosure.

Referring to FIG. 2, the electronic device 1000 may include a display module DM and an electro-optical module (e.g., the first and second camera modules CM1 and CM2). The display module DM may be a configuration for generating an image and detecting an input applied from the outside. The first and second camera modules CM1 and CM2 may be disposed under the display module DM. The first and second camera modules CM1 and CM2 are illustrated in FIG. 2 as an example. However, the number of camera modules is not limited thereto.

The display module DM may include a display area 100A and a peripheral area 100N. The display area 100A may correspond to the display area 1000A illustrated in FIG. 1. A partial area of the display area 100A may have a higher transmittance than other areas of the display area 100A. In other words, a first portion of the display area 100A may have a higher transmittance than a second portion of the display area 100A. The partial area of the display area 100A having high transmittance may include first and second sensing areas 100S1 and 100S2. The first and second sensing areas 100S1 and 100S2 may display an image, and may enable the first and second camera modules CM1 and CM2 to provide optical signals.

The first and second camera modules CM1 and CM2 may be disposed under the display module DM to correspond to the first and second sensing areas 100S1 and 100S2, respectively.

The first and second sensing areas 100S1 and 100S2 may be spaced from each other at a predetermined interval in the first direction DR1. However, the present disclosure is not limited thereto. The first and second sensing areas 100S1 and 100S2 may be spaced from each other at a predetermined interval in the second direction DR2. Alternatively, the first and second sensing areas 100S1 and 100S2 may be positioned immediately adjacent to each other without being spaced from each other.

Figure 3:
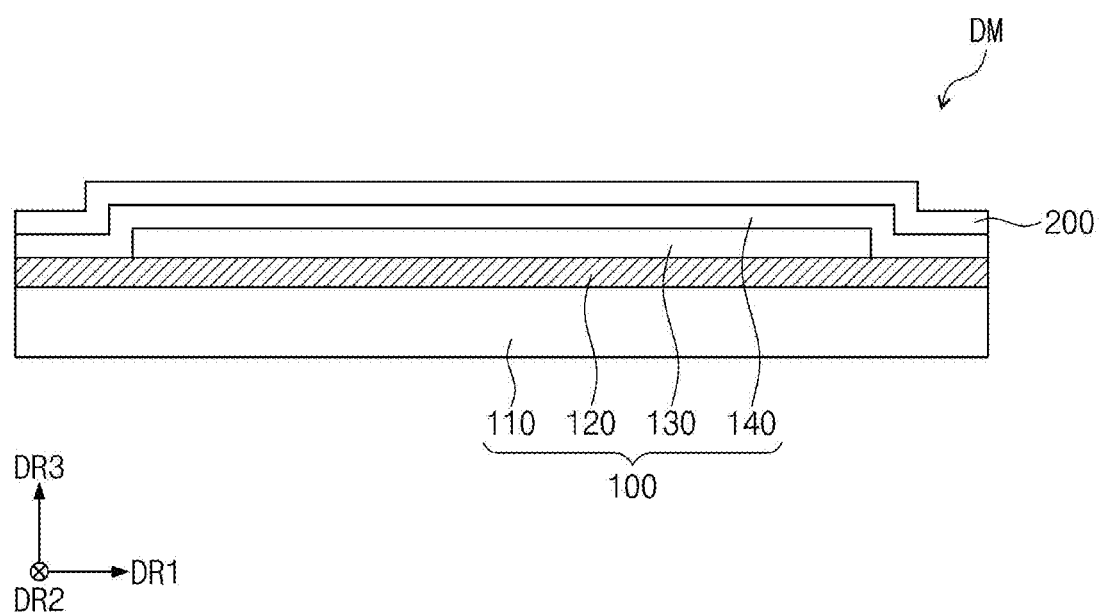
FIG. 3 is a cross-sectional view of a display module, according to an embodiment of the present disclosure.

FIG. 3 is a cross-sectional view of a display module, according to an embodiment of the present disclosure.

Referring to FIG. 3, the display module DM may include a display panel 100 and an input sensing layer 200.

The display panel 100 may be a configuration that generates an image. The display panel 100 may be a light emitting display panel. For example, the display panel 100 may be an organic light emitting display panel, an inorganic light emitting display panel, a quantum dot display panel, a micro light emitting diode (LED) display panel, or a nano LED display panel. The display panel 100 may be referred to as a display layer.

The display panel 100 may include a base layer 110, a circuit layer 120, a light emitting element layer 130, and an encapsulation layer 140.

The base layer 110 may be a member that provides a base surface on which the circuit layer 120 is disposed. The base layer 110 may be a rigid substrate, or a flexible substrate capable of bending, folding, rolling, or the like. The base layer 110 may be a glass substrate, a metal substrate, or a polymer substrate. However, an embodiment of the present disclosure is not limited thereto. For example, the base layer 110 may be an inorganic layer, an organic layer, or a composite material layer.

The base layer 110 may have a multi-layer structure. For example, the base layer 110 may include a first synthetic resin layer, an intermediate layer in a multi-layer structure or a single-layer structure, and a second synthetic resin layer disposed on the intermediate layer. The intermediate layer may be referred to a base barrier layer. The intermediate layer may include, but is not limited to, a silicon oxide (SiOx) layer and an amorphous silicon (a-Si) layer disposed on the silicon oxide layer. For example, the intermediate layer may include at least one of a silicon oxide layer, a silicon nitride layer, a silicon oxynitride layer, and an amorphous silicon layer.

Each of the first and second synthetic resin layers may include polyimide-based resin. In addition, each of the first and second synthetic resin layers may include at least one of acrylate-based resin, methacrylate-based resin, polyisoprene-based resin, vinyl-based resin, epoxy-based resin, urethane-based resin, cellulose-based resin, siloxane-based resin, polyamide-based resin, and perylene-based resin. A term "~~-based resin" in the specification indicates that "~~-based resin" includes the functional group of "~~".

The circuit layer 120 may be disposed on the base layer 110. The circuit layer 120 may include an insulating layer, a semiconductor pattern, a conductive pattern, and a signal line. The insulating layer, a semiconductor layer, and a conductive layer may be formed on the base layer 110 in a manner such as coating, evaporation, or the like. Afterward, the insulating layer, the semiconductor layer, and the conductive layer may be selectively patterned by performing a photolithography process a plurality of times. Thereafter, the semiconductor pattern, the conductive pattern, and the signal line included in the circuit layer 120 may be formed.

The light emitting element layer 130 may be disposed on the circuit layer 120. The light emitting element layer 130 may include a light emitting element. For example, the light emitting element layer 130 may include an organic light emitting material, an inorganic light emitting material, an organic-inorganic light emitting material, a quantum dot, a quantum rod, a micro-LED, or a nano-LED.

The encapsulation layer 140 may be disposed on the light emitting element layer 130. The encapsulation layer 140 may also be disposed on the circuit layer 120. The encapsulation layer 140 may protect the light emitting element layer 130 from foreign substances such as moisture, oxygen, and dust particles.

The input sensing layer 200 may be disposed on the display panel 100. For example, the input sensing layer 200 may be provided directly on the encapsulation layer 140. The input sensing layer 200 may detect an external input applied from the outside. The external input may be a user input. The user input may include various types of external inputs such as a part of a user body, light, heat, a pen, or pressure.

The input sensing layer 200 may be formed on the display panel 100 through sequential processes. In this case, the input sensing layer 200 may be directly disposed on the display panel 100. The expression "directly disposed" may mean that a component is not interposed between the input sensing layer 200 and the display panel 100. In other words, a separate adhesive member may not be interposed between the input sensing layer 200 and the display panel 100. Alternatively, the input sensing layer 200 may be coupled to the display panel 100 through an adhesive member. The adhesive member may include a typical adhesive or a sticking agent.

The display module DM may further include an anti-reflection layer disposed on the input sensing layer 200. The anti-reflection layer may reduce the reflectance of external light incident from the outside of the display module DM. The anti-reflection layer may be formed on the input sensing layer 200 through sequential processes. The anti-reflection layer may include color filters. The color filters may have a certain arrangement. For example, the color filters may be arranged in consideration of emission colors of pixels included in the display panel 100. In addition, the anti-reflection layer may further include a black matrix adjacent to the color filters.

In an embodiment of the present disclosure, the input sensing layer 200 may be omitted. In this case, an anti-reflection layer may be disposed on the display panel 100.

For example, an anti-reflection layer may be directly formed on the display panel 100 through sequential processes.

In an embodiment of the present disclosure, the display module DM may further include an optical layer disposed on the anti-reflection layer. For example, the optical layer may be formed on the anti-reflection layer through sequential processes. The optical layer may improve the front luminance of the display module DM by controlling a direction of light incident from the display panel 100. For example, the optical layer may include an organic insulating layer, on which openings are provided to respectively correspond to emission areas of pixels included in the display panel 100. The optical layer may further include a high refractive layer, which covers the organic insulating layer and which is filled in the openings. The high refractive layer may have a higher refractive index than the organic insulating layer.

Figure 4:
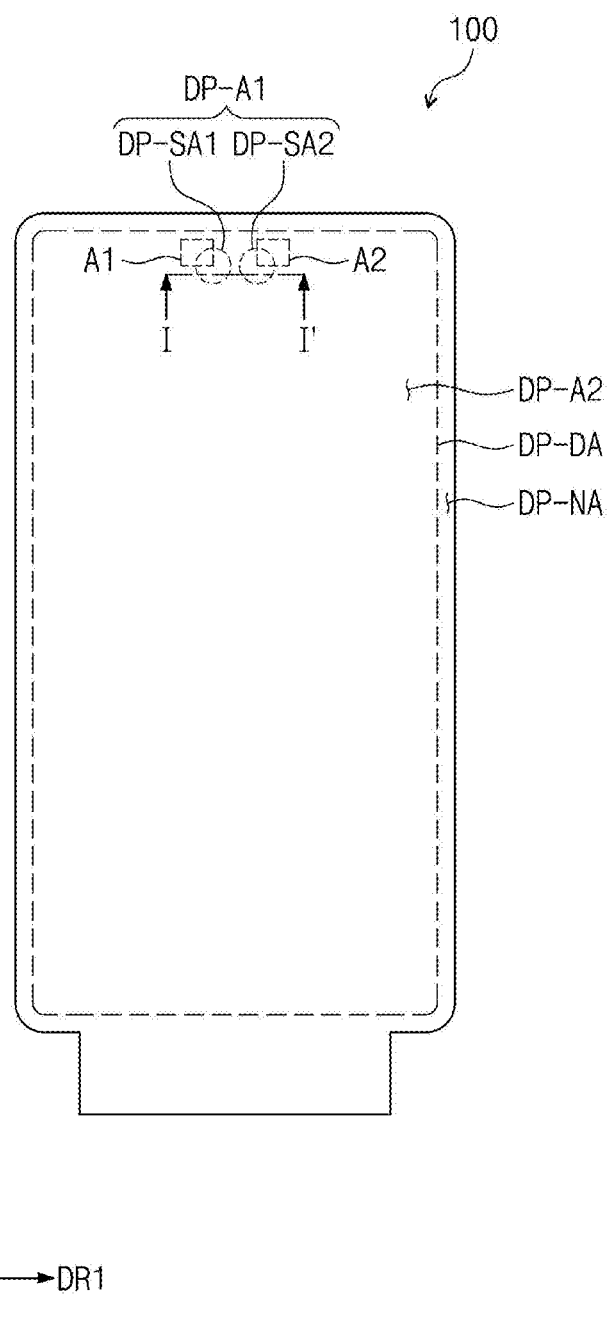
FIG. 4 is a plan view of a display panel, according to an embodiment of the present disclosure.
Figure 5A:
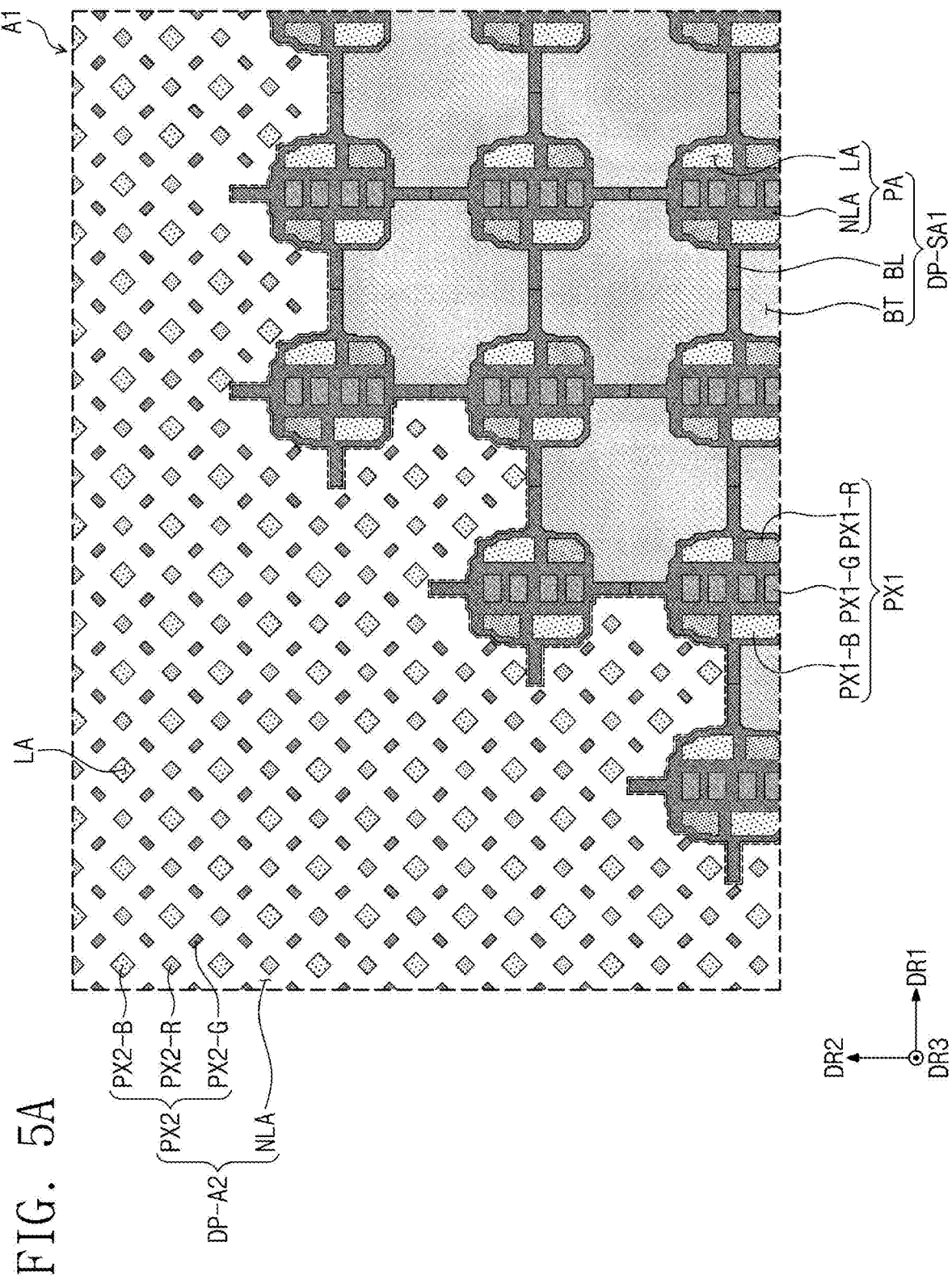
FIG. 5A is an enlarged plan view of area A1 of FIG. 4.
Figure 5B:
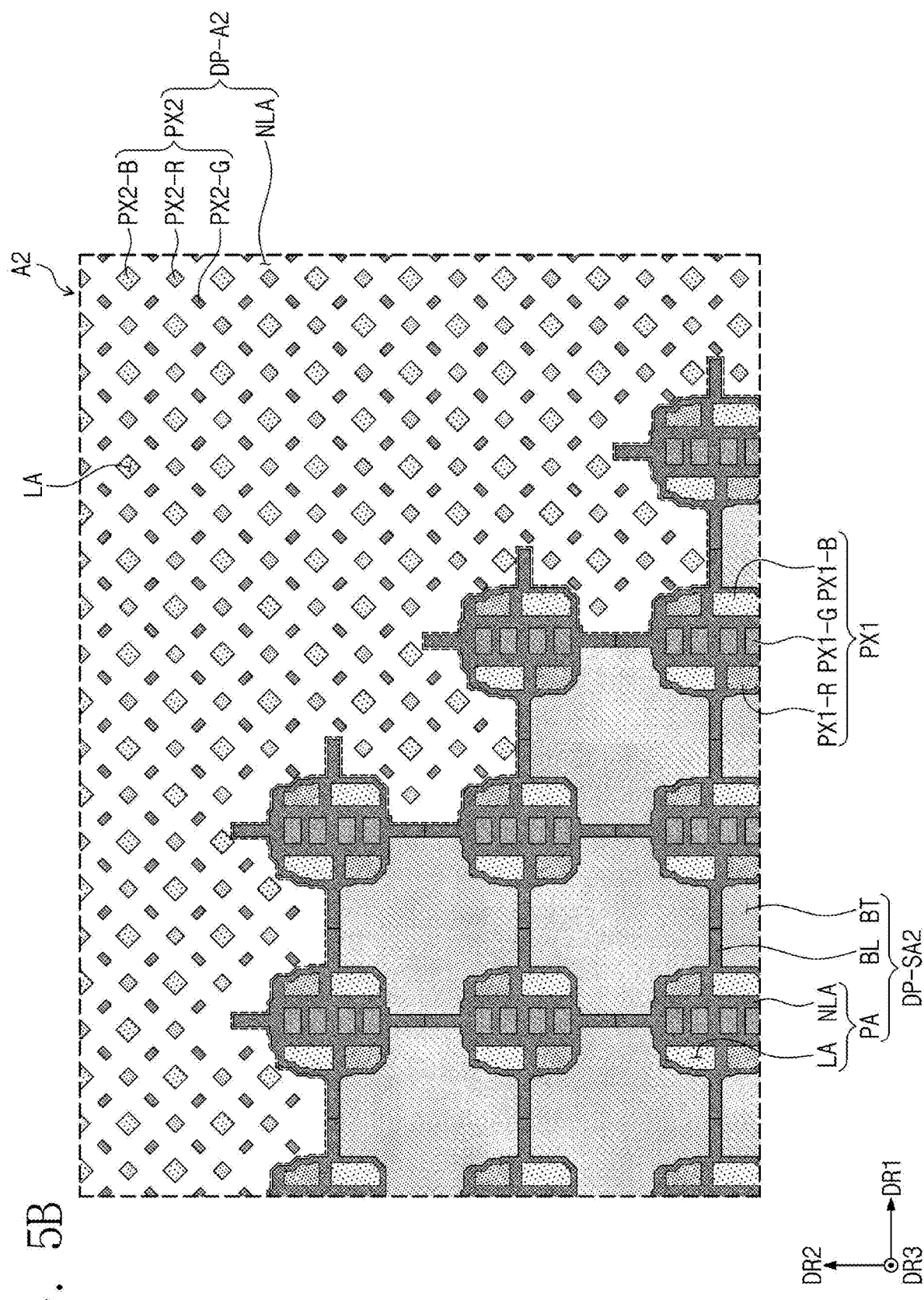
FIG. 5B is an enlarged plan view of area A2 of FIG. 4.

FIG. 4 is a plan view of a display panel, according to an embodiment of the present disclosure. FIG. 5A is an enlarged plan view of area A1 of FIG. 4. FIG. 5B is an enlarged plan view of area A2 of FIG. 4.

Referring to FIGS. 4, 5A, and 5B, the display panel 100 may include a display area DP-DA and a peripheral area DP-NA. The peripheral area DP-NA is adjacent to the display area DP-DA and may surround at least part of the display area DP-DA.

The display area DP-DA may include a first area DP-A1 and a second area DP-A2. The first area DP-A1 may be referred to as a component area or a sub display area. The second area DP-A2 may be referred to as a main display area or a general display area. The first area DP-A1 may include a first sub area DP-SA1 and a second sub area DP-SA2. The first and second sub areas DP-SA1 and DP-SA2 may be adjacent to each other in the first direction DR1. The first sub area DP-SA1 may be an area corresponding to the first sensing area 100S1 shown in FIG. 2. The second sub area DP-SA2 may be an area corresponding to the second sensing area 100S2 shown in FIG. 2. According to an embodiment of the present disclosure, it is illustrated that each of the first and second sub areas DP-SA1 and DP-SA2 has a circle shape. However, each of the first and second sub areas DP-SA1 and DP-SA2 may have various shapes, such as a polygonal shape, an oval shape, a figure having at least one curved side, or an atypical shape, and is not limited thereto.

The display panel 100 may include a plurality of pixels. A plurality of pixels may include a first pixel PX1 for emitting light in the first area DP-A1 and a second pixel PX2 for emitting light in the second area DP-A2.

The first area DP-A1 may be an area having higher light transmittance and lower resolution than the second area DP-A2. The light transmittance and resolution are measured within a reference area. The first area DP-A1 may be an area having a smaller occupancy ratio of a light blocking structure within the reference area than the second area DP-A2. The light blocking structure may include a conductive pattern of the circuit layer 120 (see FIG. 3), an electrode of a light emitting element, a light-shielding pattern, and the like.

Each of the first sub area DP-SA1 and the second sub area DP-SA2 may be an area having a lower resolution within the reference area than the second area DP-A2. Each of the first sub area DP-SA1 and the second sub area DP-SA2 may be an area in which a smaller number of pixels are positioned within the reference area (or the same area) than the number of pixels in the second area DP-A2.

As shown in FIGS. 5A and 5B, the first pixel PX1 may be positioned in the first sub area DP-SA1 and the second sub area DP-SA2. The second pixel PX2 may be positioned in the second area DP-A2. When areas of pixels having the same color are compared with one another, the first pixel PX1 and the second pixel PX2 may have different emission areas. The first pixel PX1 and the second pixel PX2 may have different arrangement structures from each other.

FIGS. 5A and 5B illustrate that emission areas LA of the first pixel PX1 and the second pixel PX2 are representative of the first pixel PX1 and the second pixel PX2. Each of the emission areas LA may be an area in which a first electrode (an anode or a pixel electrode) of a light emitting element is exposed from a pixel defining layer. A non-emission area NLA is positioned between the emission areas LA in the first and second areas DP-A1 and DP-A2.

The first pixel PX1 may include a first color pixel PX1-R, a second color pixel PX1-G, and a third color pixel PX1-B. The second pixel PX2 may include a first color pixel PX2-R, a second color pixel PX2-G, and a third color pixel PX2-B. The first color pixels PX1-R and PX2-R may be red pixels; the second color pixels PX1-G and PX2-G may be green pixels; and the third color pixels PX1-B and PX2-B may be blue pixels.

Each of the first sub area DP-SA1 and the second sub area DP-SA2 may include a pixel area PA, a wire area BL, and a transparent area BT. The first pixel PX1 is positioned in the pixel area PA. It is illustrated that the two first color pixels PX2-R, the four second color pixels PX2-G, and the two third color pixels PX2-B are positioned in the pixel area PA, but the present disclosure is not limited thereto. In addition, it is illustrated that the two first color pixels PX1-R, the four second color pixels PX1-G, and the two third color pixels PX2-1 are positioned in the pixel area PA, but the present disclosure is not limited thereto.

A conductive pattern, a signal line, or a light-shielding pattern corresponding to the first pixel PX1 is disposed in the pixel area PA and the wire area BL. The light-shielding pattern may be a metal pattern, and may overlap the pixel area PA and the wire area BL. The pixel area PA and the wire area BL may be opaque areas through which an optical signal does not substantially pass.

The transparent area BT is an area through which the optical signal substantially passes. The first pixel PX1 is not positioned in the transparent area BT, and thus a conductive pattern, a signal line, or a light-shielding pattern is positioned in the transparent area BT. Accordingly, the transparent area BT increases the light transmittance of each of the first sub area DP-SA1 and the second sub area DP-SA2.

The second area DP-A2 has first light transmittance; the first sub area DP-SA1 has second light transmittance higher than the first light transmittance; and the second sub area DP-SA2 has third light transmittance higher than the first light transmittance. As an example, the second light transmittance may be the same as the third light transmittance. In other words, the first sub area DP-SA1 and the second sub area DP-SA2 may have the same light transmittance as each other. As another example, the second light transmittance may be different from the third light transmittance. For example, the first sub area DP-SA1 may have higher light transmittance than the second sub area DP-SA2.

Figure 6A:
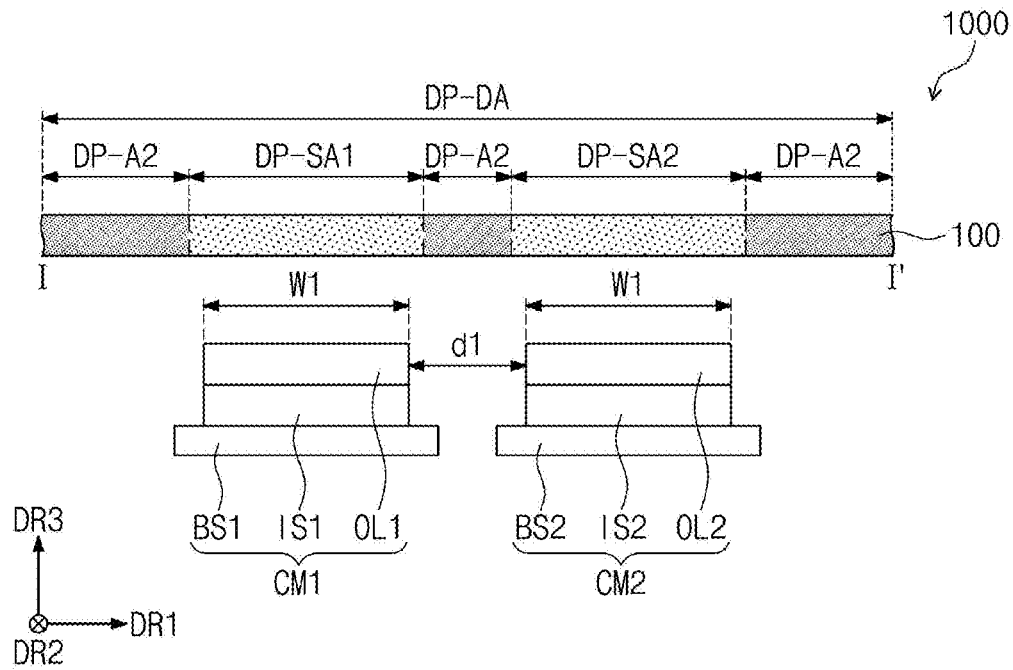
FIG. 6A is a cross-sectional view illustrating a partial configuration of an electronic device along line I-I' shown in FIG. 4.
Figure 6B:
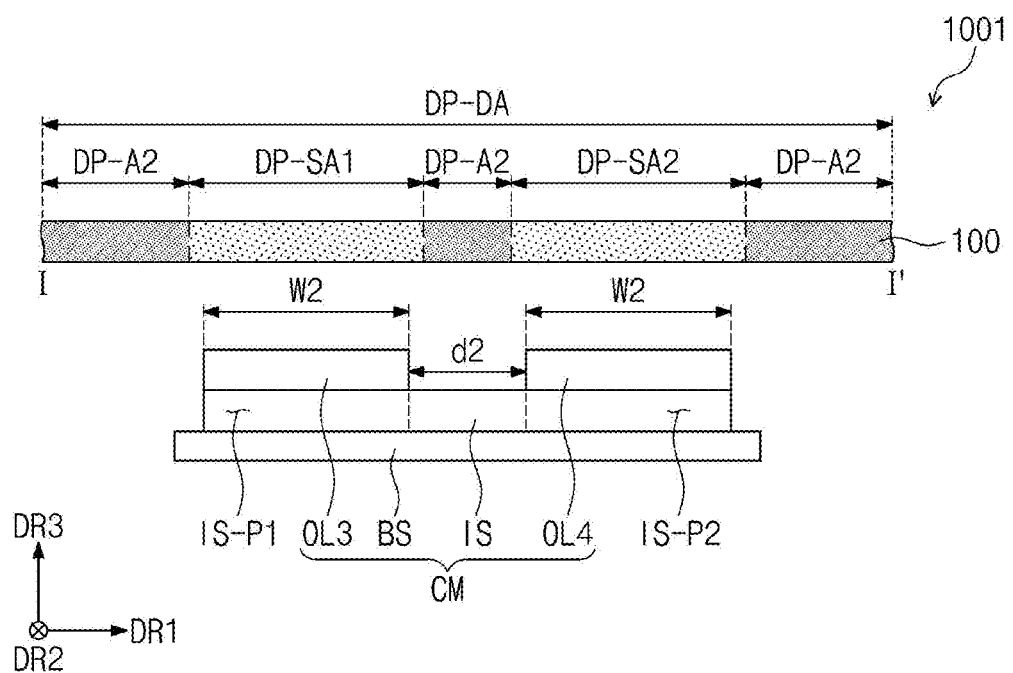
FIG. 6B is a cross-sectional view illustrating a partial configuration of an electronic device, according to an embodiment of the present disclosure.

FIG. 6A is a cross-sectional view illustrating a partial configuration of an electronic device taken along line I-I' shown in FIG. 4. FIG. 6B is a cross-sectional view illustrating a partial configuration of an electronic device, according to an embodiment of the present disclosure.

Referring to FIG. 6A, the first camera module CM1 overlaps the first sub area DP-SA1 of the display panel 100 and is disposed under the first sub area DP-SA1. The second camera module CM2 overlaps the second sub area DP-SA2 of the display panel 100 and is positioned under the second sub area DP-SA2.

The first camera module CM1 may include a first base substrate BS1, a first image sensor IS1, and a first optical module OL1. The first image sensor IS1 is mounted on the first base substrate BS1. The first optical module OL1 is disposed on the first image sensor IS1. The second camera module CM2 may include a second base substrate BS2, a second image sensor IS2, and a second optical module OL2. The second image sensor IS2 is mounted on the second base substrate BS2. The second optical module OL2 is disposed on the second image sensor IS2. As an example, a structure in which the first and second image sensors IS1 and IS2 are respectively mounted on the first and second base substrates BS1 and BS2 that are independent of each other is illustrated. However, the present disclosure is not limited thereto. The first and second base substrates BS1 and BS2 may have an integral shape.

Each of the first and second image sensors IS1 and IS2 may be implemented with one of a charge coupled device (CCD) sensor or a complementary metal oxide semiconductor (CMOS) sensor. As an example, the first and second image sensors IS1 and IS2 may have the same optical characteristics as each other. For example, the first and second image sensors IS1 and IS2 may have the same resolution as each other. However, the present disclosure is not limited thereto. The first and second image sensors IS1 and IS2 may have different resolutions from each other.

Each of the first and second optical modules OL1 and OL2 may include an optical lens. The first image sensor IS1 may generate first image data based on an optical signal incident through the first optical module OL1. The second image sensor IS2 may generate second image data based on an optical signal incident through the second optical module OL2. The first image data may be data corresponding to a first image captured by the first camera module CM1. The second image data may be data corresponding to a second image captured by the second camera module CM2.

The first camera module CM1 and the second camera module CM2 are adjacent to each other in the first direction DR1. The first camera module CM1 and the second camera module CM2 are spaced from each other by a first interval d1 in the first direction DR1. The first interval d1 may be an interval between the first optical module OL1 and the second optical module OL2 or an interval between the first image sensor IS1 and the second image sensor IS2. Each of the first and second camera modules CM1 and CM2 may have a first width W1 in the first direction DR1. The first width W1 of each of the first and second camera modules CM1 and CM2 may be a width of each of the first and second image sensors IS1 and IS2 or a width of each of the first and second optical modules OL1 and OL2. For example, the first image sensor IS1 and the first optical module OL1 may have the same width.

The first interval d1 may be greater than or equal to a preset reference interval, and may be less than or equal to twice the first width W1. As an example, the reference interval may be about 1.5 micrometer (mm). When the first interval d1 is less than about 1.5 micrometer (mm), there may be little or a slight difference between the first and second images captured by the first and second camera modules CM1 and CM2.

An embodiment of the present disclosure provides an electronic device 1000 including: a display panel 100 including a display area DP-DA and a peripheral area DP-NA adjacent to the display area; and an electro-optical module adjacent to the display panel, wherein the display area includes a first area DP-A1 and a second area DP-A2 adjacent to the first area, and wherein the electro-optical module includes a plurality of camera modules CM1/CM2, and each of the plurality of camera modules CM1/CM2 receives an optical signal passing through the first area DP-A1.

Referring to FIG. 6B, an electronic device 1001 according to an embodiment of the present disclosure may include one camera module CM disposed under the display panel 100 to overlap the first and second sub areas DP-SA1 and DP-SA2.

The camera module CM may include a base substrate BS, an image sensor IS, a first optical module OL3, and a second optical module OL4. The image sensor IS is mounted on the base substrate BS. The base substrate BS and the image sensor IS both overlap the first and second sub areas DP-SA1 and DP-SA2. The image sensor IS may be a charge coupled device (CCD) sensor or a complementary metal oxide semiconductor (CMOS) sensor.

The first optical module OL3 is disposed on a first portion IS-P1 of the image sensor IS and overlaps the first sub area DP-SA1. The second optical module OL4 is disposed on a second portion IS-P2 of the image sensor IS and overlaps the second sub area DP-SA2. Each of the first and second optical modules OL3 and OL4 may include an optical lens. The image sensor IS may generate image data based on optical signals incident through the first and second optical modules OL3 and OL4. The image data may include first portion image data corresponding to the first portion IS-P1 and second portion image data corresponding to the second portion IS-P2.

The image sensor IS may have a shape elongated in the first direction DR1. The first and second optical modules OL3 and OL4 are adjacent to each other in the first direction DR1. The first and second optical modules OL3 and OL4 are spaced from each other by a second interval d2 in the first direction DR1. Each of the first and second optical modules OL3 and OL4 may have a second width W2 in the first direction DR1.

The second interval d2 may be greater than or equal to a preset reference interval, and may be less than or equal to twice the second width W2. As an example, the reference interval may be about 1.5 micrometer (mm). When the second interval d2 is less than about 1.5 micrometer (mm), there may be little or a slight difference between the first portion image data and the second portion image data.

Figure 8A:
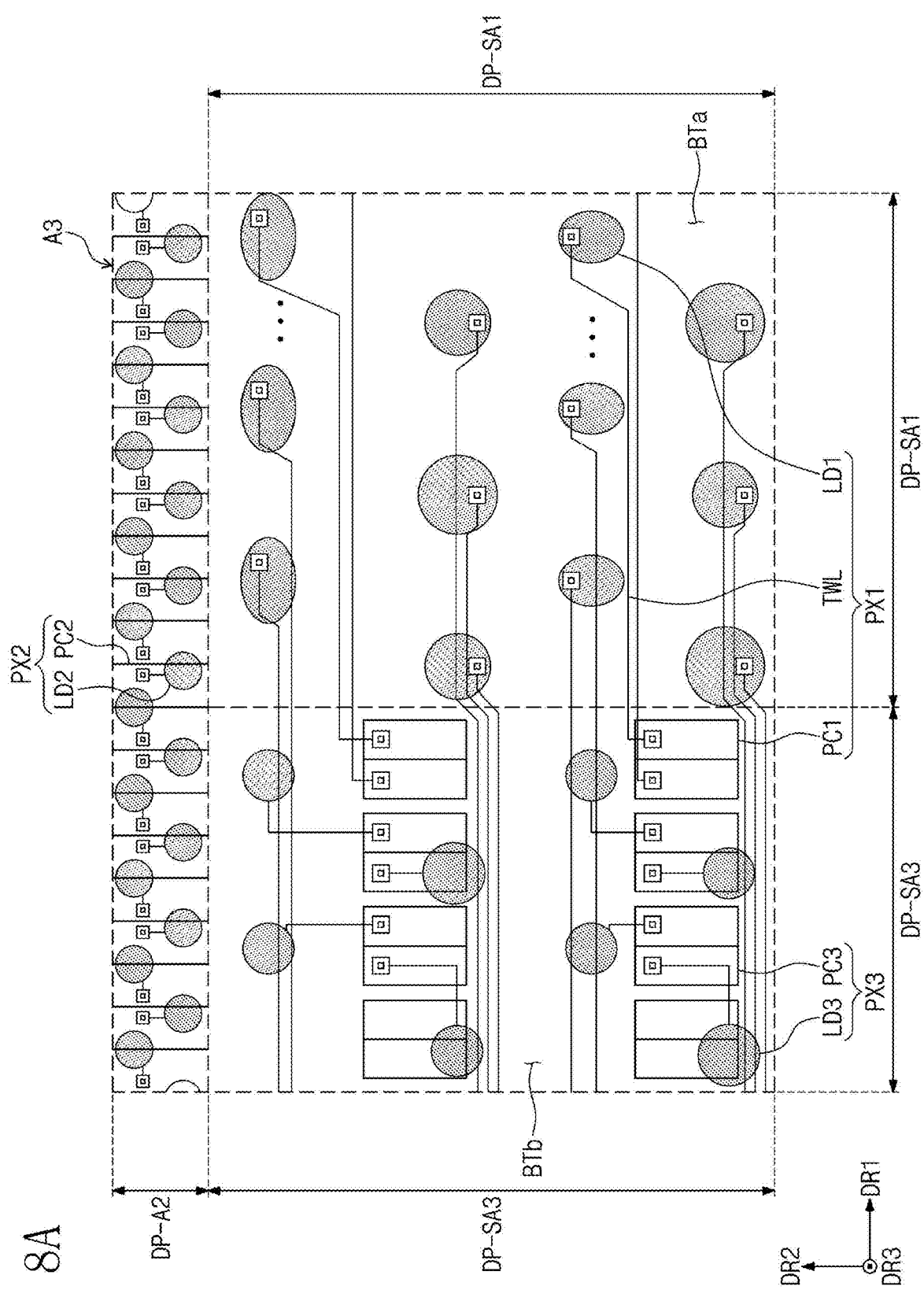
FIG. 8A is an enlarged plan view of area A3 of FIG. 7.
Figure 8B:
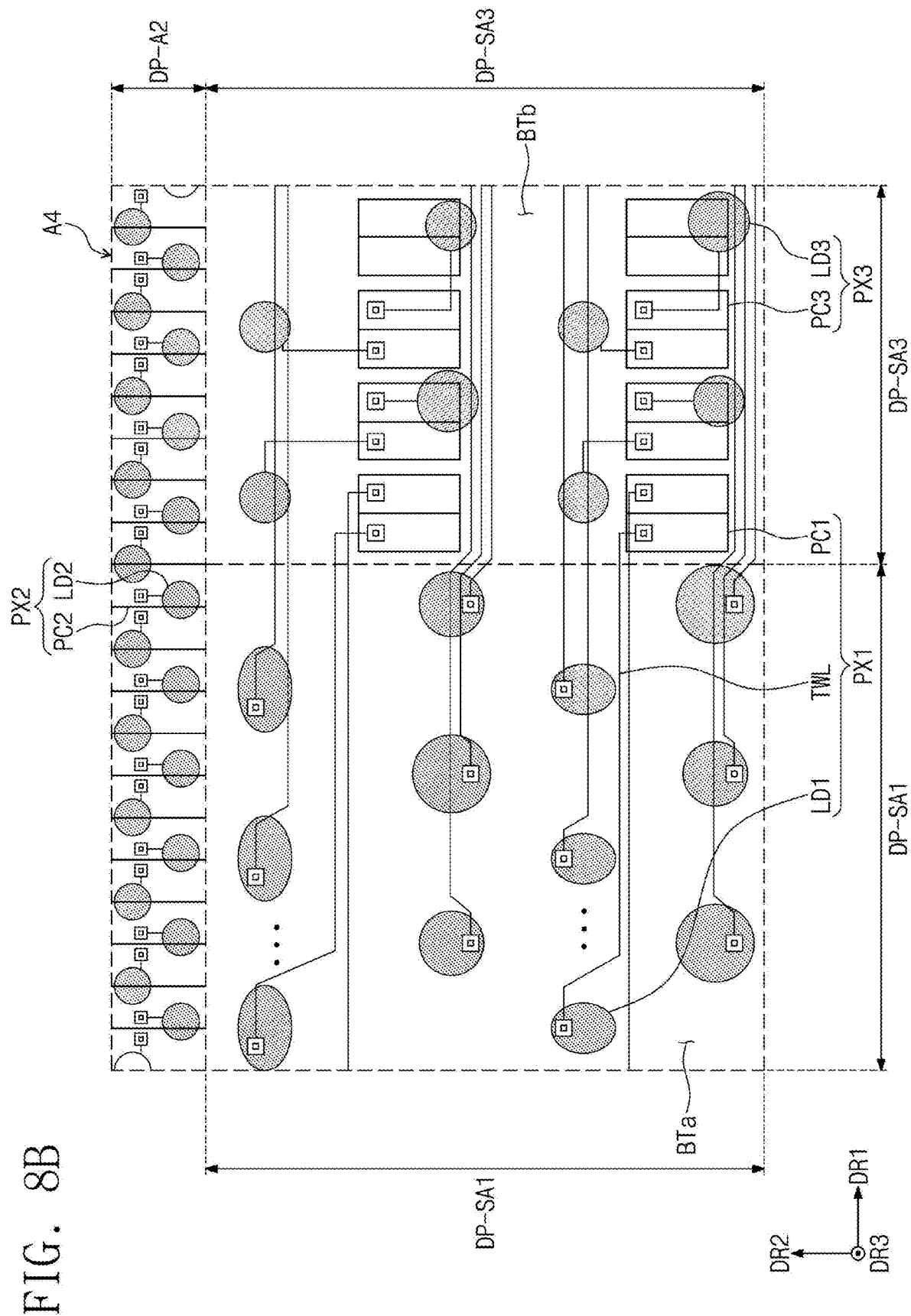
FIG. 8B is an enlarged plan view of area A4 of FIG. 7.

FIG. 7 is a plan view of a display panel, according to an embodiment of the present disclosure. FIG. 8A is an enlarged plan view of area A3 of FIG. 7. FIG. 8B is an enlarged plan view of area A4 of FIG. 7.

Referring to FIGS. 7, 8A, and 8B, the display area DP-DA may include a first area DP-A1a and the second area DP-A2. The first area DP-A1a may include the first sub area DP-SA1, the second sub area DP-SA2, and a third sub area DP-SA3. The first sub area DP-SA1 may be an area corresponding to the first sensing area 100S1 shown in FIG. 2. The second sub area DP-SA2 may be an area corresponding to the second sensing area 100S2 shown in FIG. 2. The third sub area DP-SA3 may surround the first and second sub areas DP-SA1 and DP-SA2. The third sub area DP-SA3 may be disposed between the first sub area DP-SA1 and the second area DP-A2 and between the second sub area DP-SA2 and the second area DP-A2. The third sub area DP-SA3 may be referred to as a "transition area" or an "intermediate area".

A display panel 101 may include a plurality of pixels. The plurality of pixels may include a first pixel PX1 for emitting light in the first and second sub areas DP-SA1 and DP-SA2 and a second pixel PX2 for emitting light in the second area DP-A2. The plurality of pixels may further include a third pixel PX3 for emitting light from the third sub area DP-SA3.

A plurality of first pixels PX1, a plurality of second pixels PX2, and a plurality of third pixels PX3 may be provided. In this case, each of the first to third pixels PX1, PX2, and PX3 may include a red pixel, a green pixel, and a blue pixel, and may further include a white pixel according to an embodiment of the present disclosure.

Each of the first pixels PX1 includes a first light emitting element LD1 and a first pixel circuit PC1 to drive the first light emitting element LD1, each of the second pixel PX2 includes a second light emitting element LD2 and a second pixel circuit PC2 to drive the second light emitting element LD2, and each of the third pixels PX3 may include a third light emitting element LD3 and a third pixel circuit PC3 to drive the third light emitting element LD3.

To secure the area of a transparent area BTa, the first and second sub areas DP-SA1 and DP-SA2 may be provided with pixels fewer than the second area DP-A2. In the first and second sub areas DP-SA1 and DP-SA2, an area where the first light emitting element LD1 is not disposed may be the transparent area BTa.

Within a reference area or the same area, the number of the first pixels PX1 disposed in the first and second sub areas DP-SA1 and DP-SA2 may be less than the number of the second pixels PX2 disposed in the second area DP-A2. For example, each of the first and second sub areas DP-SA1 and DP-SA2 is about ½, ⅜, ⅓, ¼, ⅖, ⅛, ⅑, or ¹⁄₁₆ of the resolution of the second area DP-A2. For example, the resolution of the second area DP-A2 may be greater than about 400 ppi. Each of the first and second sub areas DP-SA1 and DP-SA2 may have a resolution of about 200 ppi or about 100 ppi. However, this is only an example and the present disclosure is not particularly limited thereto.

The first pixel circuit PC1 of the first pixels PX1 may not be positioned in the first and second sub areas DP-SA1 and DP-SA2. For example, the first pixel circuit PC1 may be positioned in the third sub area DP-SA3. In this case, the light transmittance of each of the first and second sub areas DP-SA1 and DP-SA2 may be increased as compared with a case where the first pixel circuit PC1 is positioned in the first and second sub areas DP-SA1 and DP-SA2.

The first light emitting element LD1 and the first pixel circuit PC1 may be electrically connected to each other through a connection wire TWL. The connection wire TWL may be positioned in the first and second sub areas DP-SA1 and DP-SA2. The connection wire TWL may include a transparent conductive wire. The transparent conductive wire may include a transparent conductive material or a light transmissive material. For example, the connection wire TWL may be formed of a film of transparent conductive oxide (TCO) such as indium tin oxide (ITO), indium zinc oxide (IZO), indium gallium zinc oxide (IGZO), zinc oxide (ZnO) or indium oxide (In2O3). When the connection wire TWL is a transparent conductive wire, the connection wire TWL may be included in the transparent area BTa.

The third sub area DP-SA3 is adjacent to the first and second sub areas DP-SA1 and DP-SA2. The third sub area DP-SA3 may surround at least part of the first and second sub areas DP-SA1 and DP-SA2. The third sub area DP-SA3 may be an area having lower light transmittance than the first and second sub areas DP-SA1 and DP-SA2. In an embodiment of the present disclosure, the third sub area DP-SA3 may be spaced from the peripheral area DP-NA. However, the present disclosure is not limited thereto, and the third sub area DP-SA3 may directly contact the peripheral area DP-NA.

The first pixel circuit PC1 of the first pixels PX1, the third light emitting element LD3 of the third pixels PX3, and the third pixel circuit PC3 of the third pixels PX3 may be positioned in the third sub area DP-SA3. Accordingly, the light transmittance of the third sub area DP-SA3 may be lower than that of the first and second sub areas DP-SA1 and DP-SA2. Furthermore, since the first pixel circuit PC1 of the first pixels PX1 is positioned in the third sub area DP-SA3, the number of the third pixels PX3 positioned in the third sub area DP-SA3 may be less than the number of the second pixels PX2 positioned in the second area DP-A2, within a unit area or the same area. The resolution of an image displayed in the third sub area DP-SA3 may be lower than the resolution of an image displayed in the second area DP-A2. In the third sub area DP-SA3, an area where the third light emitting element LD3 and the first and third pixel circuits PC1 and PC3 are not disposed may be a transparent area BTb.

The second area DP-A2 is adjacent to the third sub area DP-SA3. The second area DP-A2 may be an area having lower transmittance than the third sub area DP-SA3. The second light emitting element LD2 and the second pixel circuit PC2 may be positioned in the second area DP-A2.

The plurality of first light emitting elements LD1, the plurality of second light emitting elements LD2, and the plurality of third light emitting elements LD3 may be provided as shown in FIGS. 8A and 8B. An interval between two first light emitting elements, which are most adjacent to each other, from among the first light emitting elements LD1 may be greater than an interval between two third light emitting elements, which are most adjacent to each other, from among the third light emitting elements LD3. An interval between two second light emitting elements, which are most adjacent to each other, from among the second light emitting elements LD2 may be less than an interval between two third light emitting elements, which are most adjacent to each other, from among the third light emitting elements LD3.

Figure 9A:
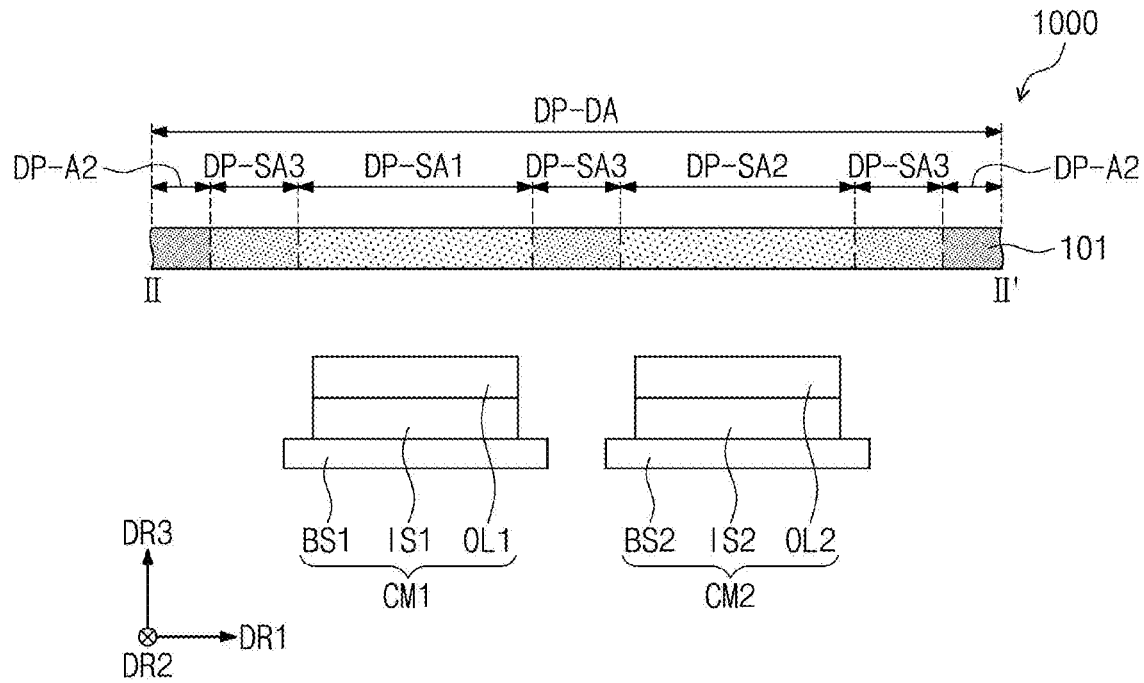
FIG. 9A is a cross-sectional view illustrating a partial configuration of an electronic device along line II-II' shown in FIG. 7.
Figure 9B:
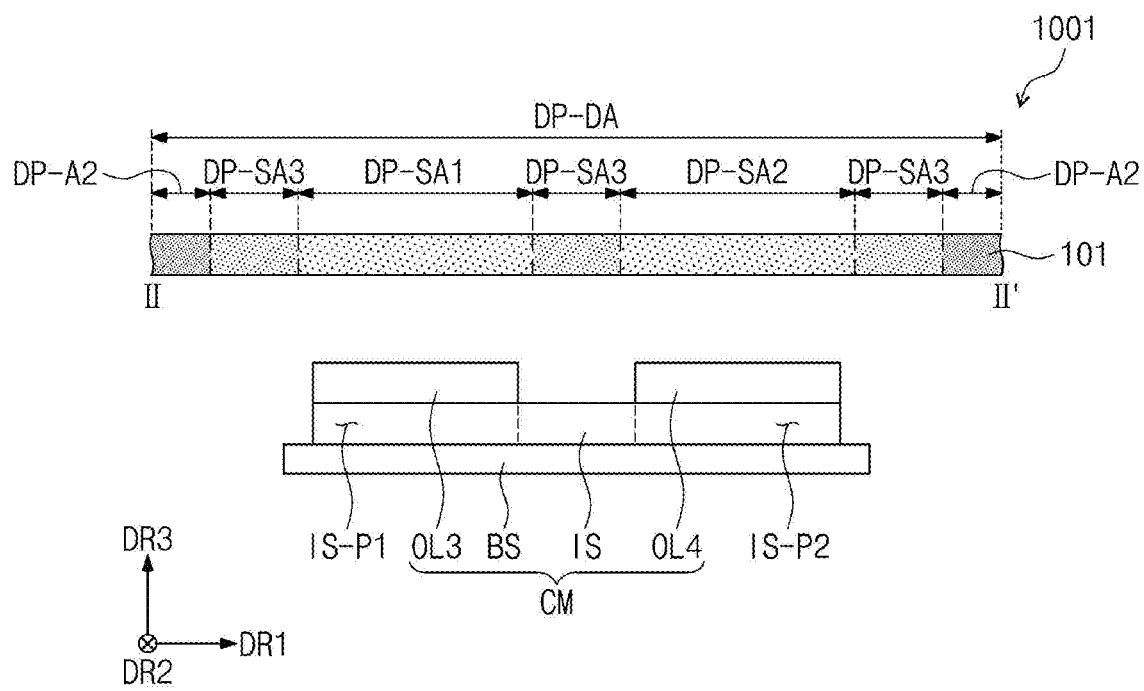
FIG. 9B is a cross-sectional view illustrating a partial configuration of an electronic device, according to an embodiment of the present disclosure.

FIG. 9A is a cross-sectional view illustrating a partial configuration of an electronic device along line II-II' shown in FIG. 7. FIG. 9B is a cross-sectional view illustrating a partial configuration of an electronic device, according to an embodiment of the present disclosure.

Referring to FIG. 9A, the first camera module CM1 overlaps the first sub area DP-SA1 of the display panel 101 and is disposed under the first sub area DP-SA1. The second camera module CM2 overlaps the second sub area DP-SA2 of the display panel 101 and is positioned under the second sub area DP-SA2.

The first camera module CM1 may include the first base substrate BS 1, the first image sensor IS1, and the first optical module OL1. The first image sensor IS1 is mounted on the first base substrate BS1. The first optical module OL1 is disposed on the first image sensor IS1. The second camera module CM2 may include the second base substrate BS2, the second image sensor IS2, and the second optical module OL2. The second image sensor IS2 is mounted on the second base substrate BS2. The second optical module OL2 is disposed on the second image sensor IS2.

The configurations of the first and second camera modules CM1 and CM2 are the same as or similar to those of FIG. 6A, and thus a detailed description thereof will be omitted. The first and second image sensors IS1 and IS2 (or the first and second optical modules OL1 and OL2) may not overlap the third sub area DP-SA3. For example, the first and second image sensors IS1 and IS2 (or the first and second optical modules OL1 and OL2) may be spaced apart from the third sub area DP-SA3 along the first direction DR1.

Referring to FIG. 9B, the electronic device 1001 according to an embodiment of the present disclosure may include one camera module CM disposed under the display panel 101 to overlap the first and second sub areas DP-SA1 and DP-SA2.

The camera module CM may include the base substrate BS, the image sensor IS, the first optical module OL3, and the second optical module OL4. The configurations of the camera module CM are the same as or similar those of FIG. 6B, and thus a detailed description thereof will be omitted. The first and second optical modules OL3 and OL4 may not overlap the third sub area DP-SA3. For example, the first and second optical modules OL3 and OL4 may be spaced apart from the third sub area DP-SA3 along the first direction DR1.

Figure 10:
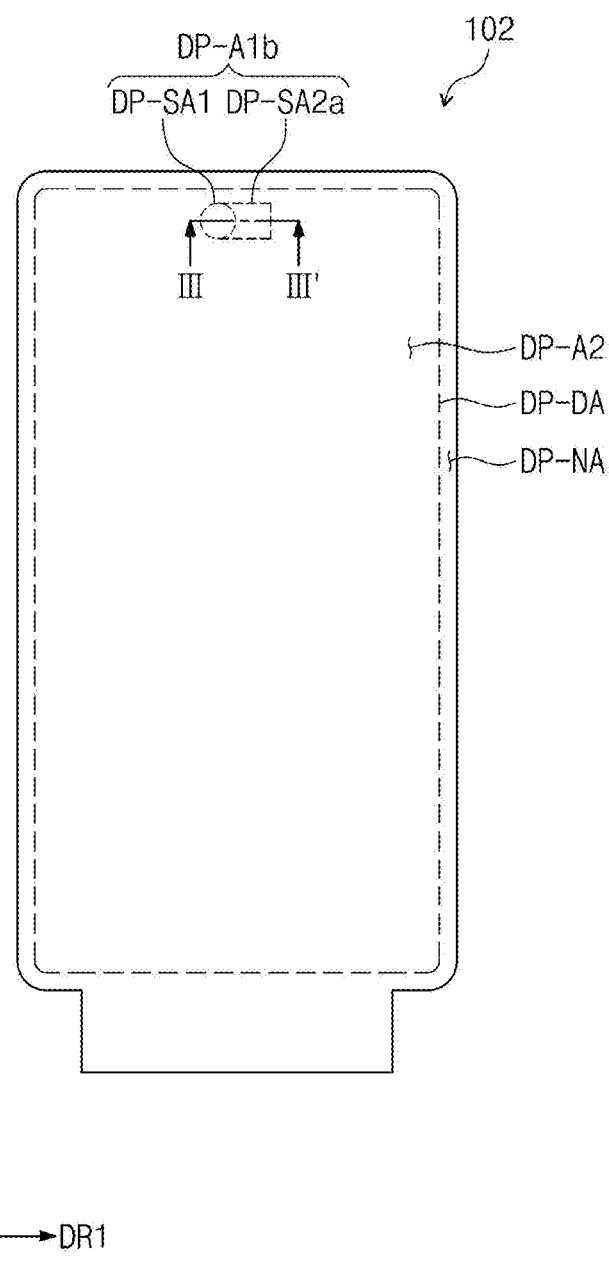
FIG. 10 is a plan view of a display panel, according to an embodiment of the present disclosure.
Figure 11A:
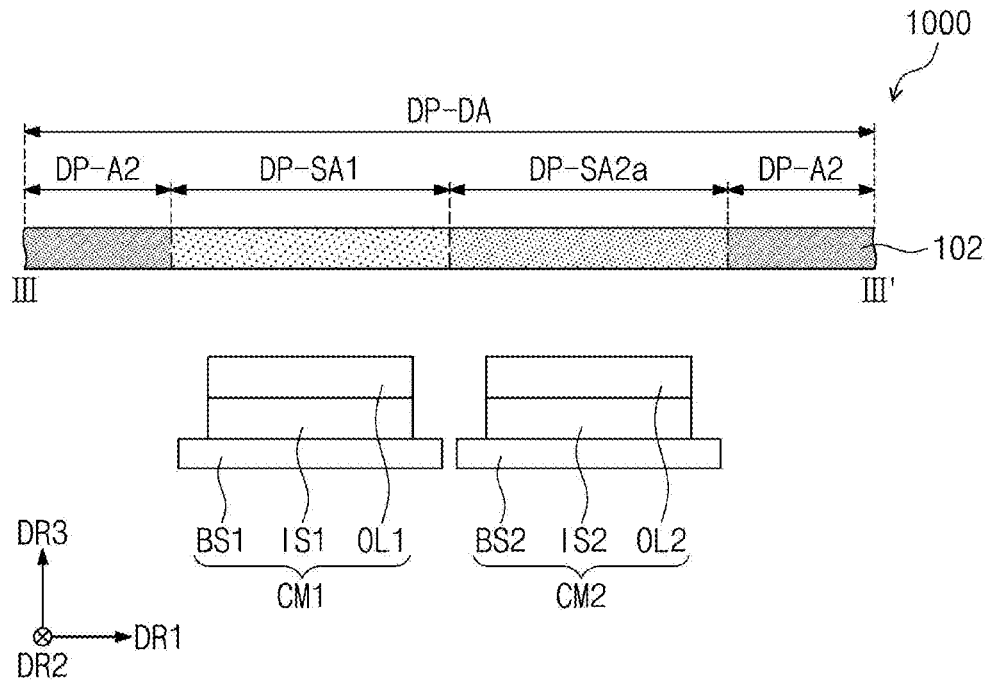
FIG. 11A is a cross-sectional view illustrating a partial configuration of an electronic device along line III-III' shown in FIG. 10.
Figure 11B:
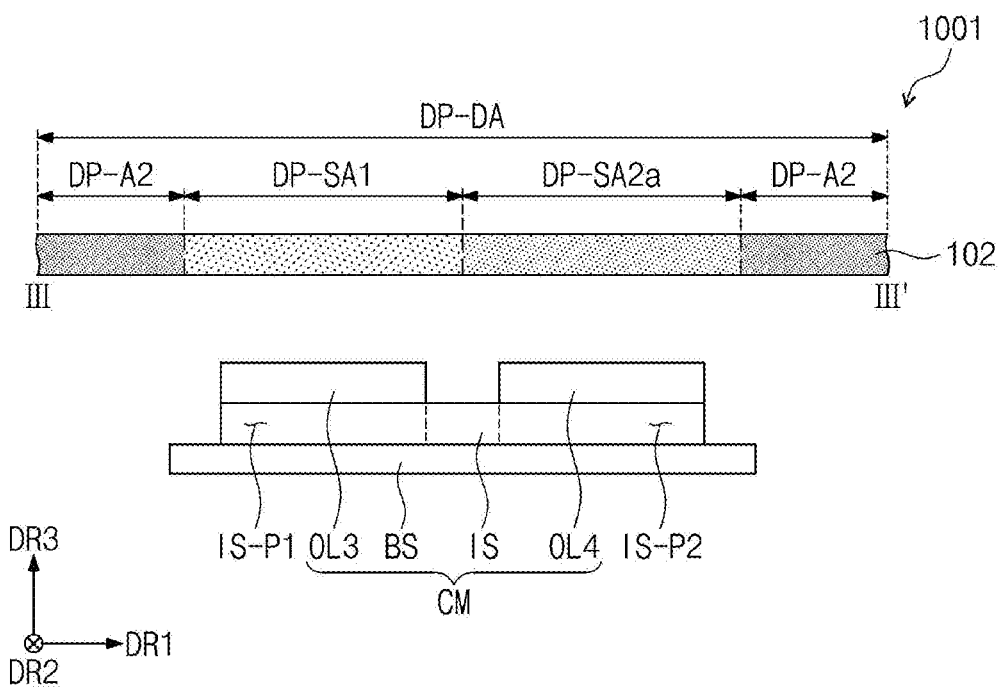
FIG. 11B is a cross-sectional view illustrating a partial configuration of an electronic device, according to an embodiment of the present disclosure.

FIG. 10 is a plan view of a display panel, according to an embodiment of the present disclosure. FIG. 11A is a cross-sectional view illustrating a partial configuration of an electronic device along line III-III' shown in FIG. 10. FIG. 11B is a cross-sectional view illustrating a partial configuration of an electronic device, according to an embodiment of the present disclosure.

Referring to FIGS. 10 and 11A, the display area DP-DA may include a first area DP-A1b and the second area DP-A2. The first area DP-A1b may include the first sub area DP-SA1 and a second sub area DP-SA2a. The second sub area DP-SA2a may surround at least one side of the first sub area DP-SA1. The second sub area DP-SA2a may be referred to as a "transition area" or an "intermediate area".

A display panel 102 may include a plurality of pixels. The plurality of pixels may include a first pixel for emitting light in the first sub area DP-SA1, a second pixel for emitting light in the second area DP-A2, and a third pixel for emitting light in the second sub area DP-SA2a. The first pixel may have the same structure as the first pixel PX1 shown in FIGS. 8A and 8B; the second pixel may have the same structure as the second pixel PX2 shown in FIGS. 8A and 8B; and, the third pixel may have the same structure as the third pixel PX3 shown in FIGS. 8A and 8B. Accordingly, additional description associated with the first to third pixels will be omitted to avoid redundancy.

The second sub area DP-SA2a may have lower light transmittance than the first sub area DP-SA1. A first pixel circuit of the first pixel, a third light emitting element of the third pixel, and a third pixel circuit of the third pixel may be disposed in the second sub area DP-SA2a. Accordingly, the light transmittance of the second sub area DP-SA2a may be lower than the light transmittance of the first sub area DP-SA1. Furthermore, since the first pixel circuit of the first pixel is positioned in the second sub area DP-SA2a, the number of third pixels positioned in the second sub area DP-SA2a may be less than the number of second pixels positioned in the second area DP-A2, within a unit area or the same area. The resolution of an image displayed in the second sub area DP-SA2a may be lower than the resolution of an image displayed in the second area DP-A2.

The first camera module CM1 overlaps the first sub area DP-SA1 of the display panel 102 and is positioned under the first sub area DP-SA1. The second camera module CM2 overlaps the second sub area DP-SA2a of the display panel 102 and is positioned under the second sub area DP-SA2a.

The first camera module CM1 may include a first base substrate BS1, a first image sensor IS1, and a first optical module OL1. The first image sensor IS1 is mounted on the first base substrate BS1. The first optical module OL1 is disposed on the first image sensor IS1. The second camera module CM2 may include a second base substrate BS2, a second image sensor IS2, and a second optical module OL2. The second image sensor IS2 is mounted on the second base substrate BS2. The second optical module OL2 is disposed on the second image sensor IS2.

When the first and second sub areas DP-SA1 and DP-SA2a have different light transmittance, the first and second image sensors IS1 and IS2 may have different optical characteristics from each other. For example, when the second sub area DP-SA2a has lower light transmittance than the first sub area DP-SA1, the second image sensor IS2 overlapping the second sub area DP-SA2a may have higher resolution than the first image sensor IS1 overlapping the first sub area DP-SA1. However, the present disclosure is not limited thereto. When the first and second sub areas DP-SA1 and DP-SA2a have different light transmittance, the first and second image sensors IS1 and IS2 may have the same optical characteristics as each other.

The configurations of the first and second camera modules CM1 and CM2 are the same as or similar to those of FIG. 6A, and thus a detailed description thereof will be omitted. The first and second image sensors IS1 and IS2 (or the first and second optical modules OL1 and OL2) may not overlap the second area DP-A2. For example, the first and second image sensors IS1 and IS2 (or the first and second optical modules OL1 and OL2) may be disposed between portions of the second area DP-A2 along the first direction DR1.

Referring to FIG. 11B, the electronic device 1001 according to an embodiment of the present disclosure may include one camera module CM disposed under the display panel 102 to overlap the first and second sub areas DP-SA1 and DP-SA2a.

The camera module CM may include a base substrate BS, an image sensor IS, a first optical module OL3, and a second optical module OL4. The first optical module OL3 overlaps the first sub area DP-SA1, and the second optical module OL4 overlaps the second sub area DP-SA2a.

The configurations of the camera module CM are the same as or similar to those of FIG. 6B, and thus a detailed description thereof will be omitted. The first and second optical modules OL3 and OL4 may not overlap the second area DP-A2.

Figure 12A:
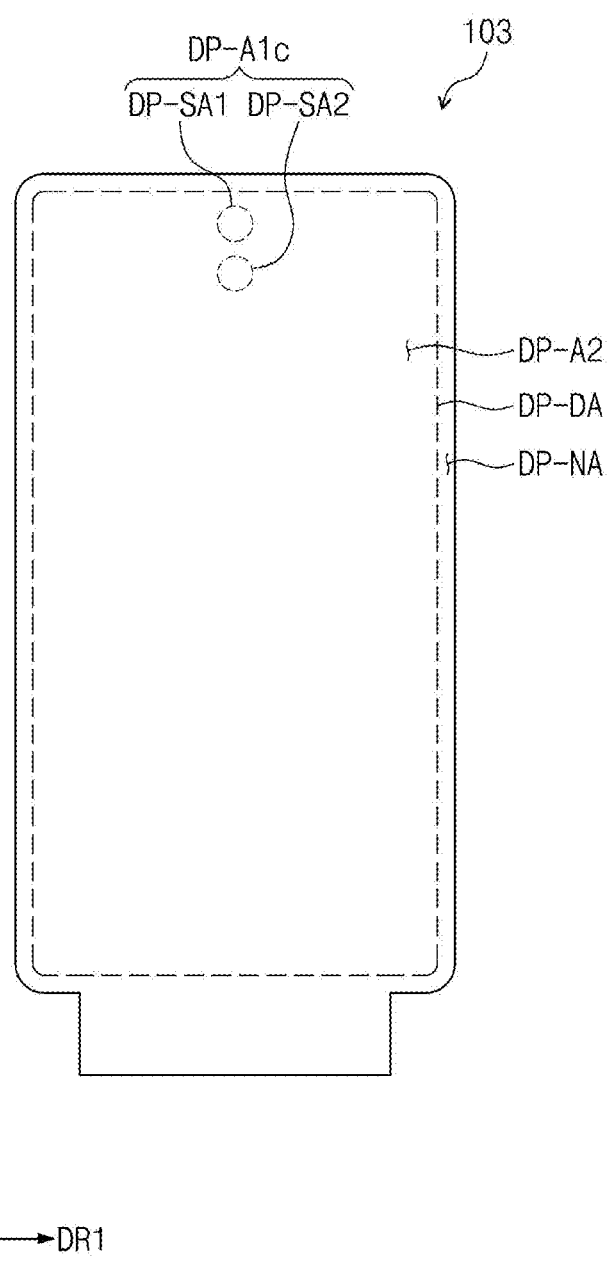
FIGS. 12A and 12B are plan views of a display panel, according to embodiments of the present disclosure.
Figure 12B:
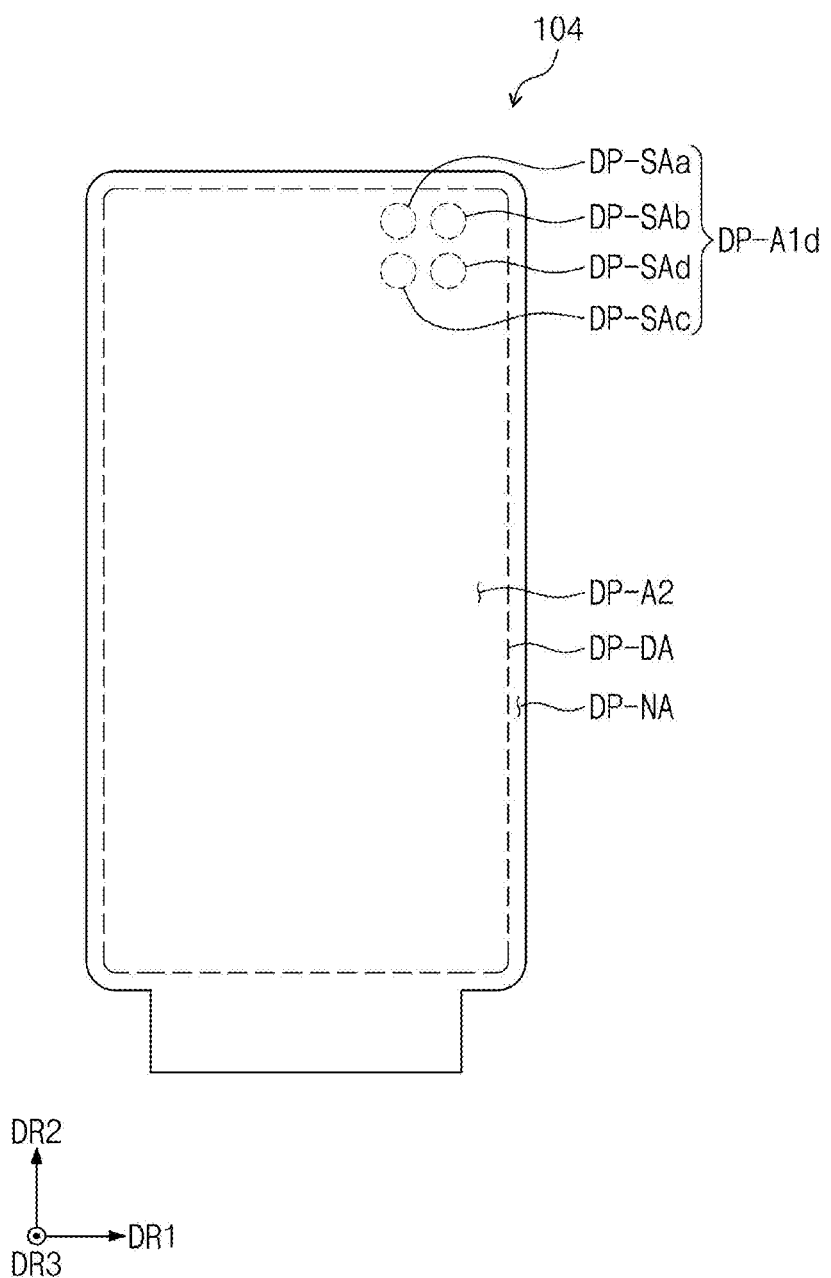

FIGS. 12A and 12B are plan views of a display panel, according to embodiments of the present disclosure.

Referring to FIG. 12A, a display panel 103 may include the display area DP-DA and the peripheral area DP-NA. The display area DP-DA may include a first area DP-A1c and the second area DP-A2. The first area DP-A1c may include a first sub area DP-SA1 and a second sub area DP-SA2. The first and second sub areas DP-SA1 and DP-SA2 may be adjacent to each other in the second direction DR2. According to an embodiment of the present disclosure, it is illustrated that each of the first and second sub areas DP-SA1 and DP-SA2 has a circle shape. However, each of the first and second sub areas DP-SA1 and DP-SA2 may have various shapes, such as a polygonal shape, an oval shape, a figure having at least one curved side, or an atypical shape, and is not limited thereto.

The first area DP-A1c may be an area having higher light transmittance and lower resolution than the second area DP-A2. The light transmittance and resolution are measured within a reference area. The first area DP-A1c may be an area having a smaller occupancy ratio of a light blocking structure within the reference area than the second area DP-A2.

Each of the first sub area DP-SA1 and the second sub area DP-SA2 may be an area having a lower resolution within the reference area than the second area DP-A2. Each of the first sub area DP-SA1 and the second sub area DP-SA2 may be an area in which a smaller number of pixels are positioned within the reference area (or the same area) than the number of pixels in the second area DP-A2.

Referring to FIG. 12B, in a display panel 104, a first area DP-A1d may include first, second, third and fourth sub areas DP-SAa, DP-SAb, DP-SAc and DP-SAd. The first and second sub areas DP-SAa and DP-SAb may be adjacent to each other in the first direction DR1. The third and fourth sub areas DP-SAc and DP-SAd may be adjacent to each other in the first direction DR1. The first and third sub areas DP-SAa and DP-SAc may be adjacent to each other in the second direction DR2. The second and fourth sub areas DP-SAb and DP-SAd may be adjacent to each other in the second direction DR2. FIG. 12B illustrates a configuration in which the first area DP-A1d includes the four sub areas DP-SAa to DP-SAd, but the number of sub areas is not limited thereto.

According to an embodiment of the present disclosure, it is illustrated that each of the first to fourth sub areas DP-SAa to DP-SAd has a circle shape. However, each of the first to fourth sub areas DP-SAa to DP-SAd may have various shapes, such as a polygonal shape, an oval shape, a figure having at least one curved side, or an atypical shape, and is not limited thereto. In addition, it is illustrated that the first to fourth sub areas DP-SAa to DP-SAd have the same shape as one another. However, at least one of the first to fourth sub areas DP-SAa to DP-SAd may have a different shape.

Figure 13:
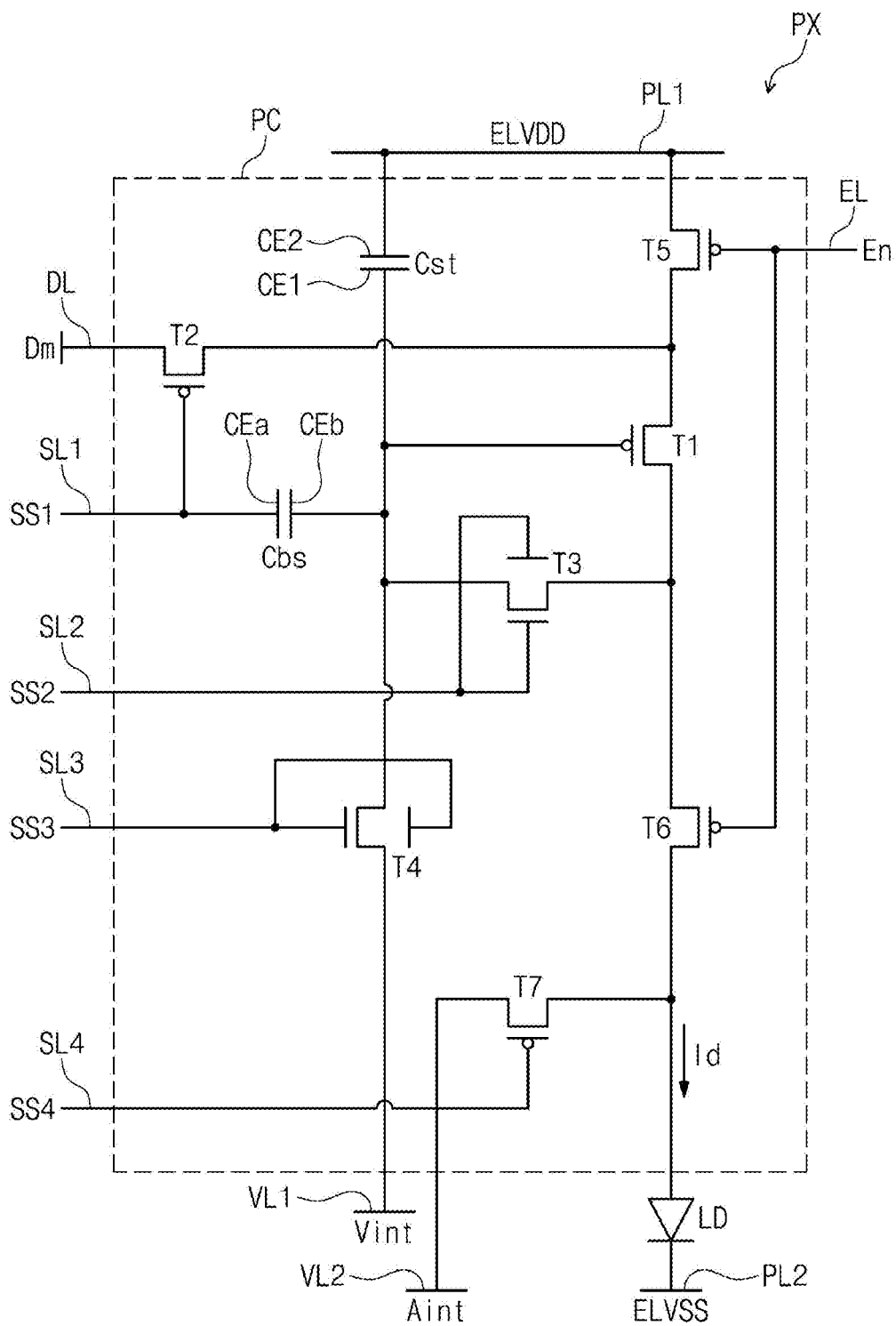
FIG. 13 is a circuit diagram of a pixel, according to an embodiment of the present disclosure.

FIG. 13 is a circuit diagram of a pixel, according to an embodiment of the present disclosure.

FIG. 13 illustrates an equivalent circuit of one pixel PX of the plurality of pixels PX. The one pixel PX shown in FIG. 13 may be the first pixel PX1 (see FIGS. 8A and 8B), the second pixel PX2 (see FIGS. 8A and 8B), or the third pixel PX3 (see FIGS. 8A and 8B). The pixel PX may include a light emitting element LD and a pixel circuit PC. The light emitting element LD may be a configuration included in the light emitting element layer 130 of FIG. 3. The pixel circuit PC may be a configuration included in the circuit layer 120 of FIG. 3.

The pixel circuit PC may include a plurality of transistors T1, T2, T3, T4, T5, T6 and T7 and a storage capacitor Cst. The plurality of transistors T1 to T7 and the storage capacitor Cst may be electrically connected to signal lines SL1, SL2, SL3, SL4, EL, and DL, a first initialization voltage line VL1, a second initialization voltage line VL2 (or an anode initialization voltage line), and first and second driving voltage lines PL1 and PL2. In an embodiment of the present disclosure, at least one of the above-described wires, for example, the first driving voltage line PL1 may be shared with neighboring pixels PX. The second driving voltage line PL2 may also be shared with neighboring pixels PX.

The plurality of transistors T1 to T7 may include a driving transistor T1, a switching transistor T2, a compensation transistor T3, a first initialization transistor T4, a first control transistor T5, a second control transistor T6, and a second initialization transistor T7.

The light emitting element LD may include a first electrode (e.g., an anode electrode or a pixel electrode) and a second electrode (e.g., a cathode electrode or a common electrode). The first electrode of the light emitting element LD may be connected to the driving transistor T1 via the second control transistor T6 to receive a driving current Id. The second electrode of the light emitting element LD may receive a second driving voltage ELVSS. The light emitting element LD may generate light having brightness corresponding to the driving current Id.

Some of the plurality of transistors T1 to T7 may be provided in a form of an n-channel metal-oxide semiconductor field-effect transistor (MOSFET) (also referred to as NMOS), and remaining transistors of the plurality of transistors T1 to T7 may be provided in a form of a p-channel MOSFET (PMOS). For example, among the plurality of transistors T1 to T7, the compensation transistor T3 and the first initialization transistor T4 may be provided in the form of an NMOS, and remaining transistors may be provided in the form of a PMOS.

According to an embodiment of the present disclosure, among the plurality of transistors T1 to T7, the compensation transistor T3, the first initialization transistor T4, and the second initialization transistor T7 may be provided in a form of an NMOS, and the remaining transistors may be provided in a form of a PMOS. Alternatively, among the plurality of transistors T1 to T7, only one transistor may be provided in the form of an NMOS and remaining transistors may be provided in the form of a PMOS. Alternatively, all of the plurality of transistors T1 to T7 may be provided in the form of an NMOS or PMOS.

Signal lines may include a first scan line SL1 for delivering a first scan signal SS1, a second scan line SL2 for delivering a second scan signal SS2, a third scan line SL3 for delivering a third scan signal SS3 to the first initialization transistor T4, an emission control line EL for delivering an emission control signal En to the first control transistor T5 and the second control transistor T6, a fourth scan line SL4 for delivering a fourth scan signal SS4 to the second initialization transistor T7, and a data line DL for delivering a data signal Dm. In the display panel of the present disclosure data lines may intersect scan lines.

The first driving voltage line PL1 may deliver a first driving voltage ELVDD to the driving transistor T1. The first initialization voltage line VL1 may deliver a first initialization voltage Vint for initializing a gate electrode of the driving transistor T1 and the first electrode of the light emitting element LD.

The gate electrode of the driving transistor T1 may be connected to the storage capacitor Cst. A source area (or first electrode) of the driving transistor T1 may be connected to the first driving voltage line PL1 via the first control transistor T5. A drain area (or second electrode) of the driving transistor T1 may be electrically connected to the first electrode of the light emitting element LD via the second control transistor T6. The driving transistor T1 may receive the data signal Dm and then may supply the driving current Id to the light emitting element LD, depending on a switching operation of the switching transistor T2.

A gate electrode of the switching transistor T2 may be connected to the first scan line SL1 for delivering the first scan signal SS1. A source area (or first electrode) of the switching transistor T2 may be connected to the data line DL. A drain area (or second electrode) of the switching transistor T2 may be connected to the source area of the driving transistor T1 and may be connected to the first driving voltage line PL1 via the first control transistor T5. The switching transistor T2 may be turned on in response to the first scan signal SS1 received through the first scan line SL1 and then may perform the switching operation of delivering the data signal Dm, which is delivered through the data line DL, to the source area of the driving transistor T1.

A gate electrode of the compensation transistor T3 is connected to the second scan line SL2. A drain area (or second electrode) of the compensation transistor T3 may be connected to the drain area of the driving transistor T1 and may be connected to the first electrode of the light emitting element LD via the second control transistor T6. A source area (or first electrode) of the compensation transistor T3 may be connected to a first electrode CE1 of the storage capacitor Cst and the gate electrode of the driving transistor T1. In addition, the source area of the compensation transistor T3 may be connected to a drain area of the first initialization transistor T4.

The compensation transistor T3 may be turned on in response to the second scan signal SS2 received through the second scan line SL2 to electrically connect the gate electrode of the driving transistor T1 to the drain area of the driving transistor T1, in other words, the driving transistor T1 may be diode-connected.

A gate electrode of the first initialization transistor T4 may be connected to the third scan line SL3. A source area (or first electrode) of the first initialization transistor T4 may be connected to the first initialization voltage line VL1. A drain area (or second electrode) of the first initialization transistor T4 may be connected to the first electrode CE1 of the storage capacitor Cst, the source area of the compensation transistor T3, and the gate electrode of the driving transistor T1. The first initialization transistor T4 may be turned on in response to the third scan signal SS3 received through the third scan line SL3 to deliver the first initialization voltage Vint to the gate electrode of the driving transistor T1 and to perform an initialization operation of initializing the gate electrode of the driving transistor T1 such that the voltage at the gate electrode of the driving transistor T1 becomes the first initialization voltage Vint.

A gate electrode of the first control transistor T5 may be connected to the emission control line EL. A source area (or first electrode) of the first control transistor T5 may be connected to the first driving voltage line PL1. A drain area (or second electrode) of the first control transistor T5 may be connected to the source area of the driving transistor T1 and the drain area of the switching transistor T2.

A gate electrode of the second control transistor T6 is connected to the emission control line EL. A source area (or first electrode) of the second control transistor T6 is connected to the drain area of the driving transistor T1 and the drain area of the compensation transistor T3. A drain area (or second electrode) of the second control transistor T6 is connected to a drain area of the second initialization transistor T7 and the first electrode of the light emitting element LD.

The first control transistor T5 and the second control transistor T6 are simultaneously turned on in response to the emission control signal En received through the emission control line EL to deliver the first driving voltage ELVDD to the light emitting element LD such that the driving current Id flows to the light emitting element LD.

A gate electrode of the second initialization transistor T7 may be connected to the fourth scan line SL4. The drain area (or second electrode) of the second initialization transistor T7 may be connected to the drain area of the second control transistor T6 and the first electrode of the light emitting element LD. A source area (or first electrode) of the second initialization transistor T7 may be connected to the second initialization voltage line VL2 to receive a second initialization voltage Aint. The second initialization transistor T7 may be turned on in response to the fourth scan signal SS4 received through the fourth scan line SL4 to initialize the first electrode of the light emitting element LD.

According to an embodiment of the present disclosure, the second initialization transistor T7 may be connected to the emission control line EL and may be driven in response to the emission control signal En. It is to be understood that locations of the source areas and the drain areas may be replaced with one another depending on the type (p-type or n-type) of a transistor.

The storage capacitor Cst may include the first electrode CE1 and a second electrode CE2. The first electrode CE1 of the storage capacitor Cst is connected to the gate electrode of the driving transistor T1. The second electrode CE2 of the storage capacitor Cst is connected to the first driving voltage line PL1. The storage capacitor Cst may store charges corresponding to a difference between a voltage at the gate electrode of the driving transistor T1 and the first driving voltage ELVDD.

A boosting capacitor Cbs may include a first electrode CEa and a second electrode CEb. The second electrode CEb of the boosting capacitor Cbs may be connected to the first electrode CE1 of the storage capacitor Cst. The first electrode CEa of the boosting capacitor Cbs may receive the first scan signal SS1. The boosting capacitor Cbs may compensate for a voltage drop at the gate electrode of the driving transistor T1 by increasing the voltage of the gate electrode of the driving transistor T1 when the supply of the first scan signal SS1 is stopped.

Hereinafter, the detailed operation of each pixel PX according to an embodiment of the present disclosure will be described.

When the third scan signal SS3 is supplied through the third scan line SL3 during an initialization period, the first initialization transistor T4 is turned on in response to the third scan signal SS3, and thus the driving transistor T1 is initialized by the first initialization voltage Vint supplied from the first initialization voltage line VL1.

When the first scan signal SS1 and the second scan signal SS2 are supplied through the first scan line SL1 and the second scan line SL2 during a data programming period, the switching transistor T2 and the compensation transistor T3 are turned on in response to the first scan signal SS1 and the second scan signal SS2. In this case, the driving transistor T1 is diode-connected by the turned-on compensation transistor T3 and is forward-biased.

Then, a compensation voltage Dm+Vth (Vth is a negative value), which is obtained by subtracting a threshold voltage Vth of the driving transistor T1 from the data signal Dm supplied from the data line DL, is applied to the gate electrode of the driving transistor T1.

The first driving voltage ELVDD and the compensation voltage Dm+Vth are applied across opposite terminals of the storage capacitor Cst (e.g., the first and second electrodes CE1 and CE2), and the storage capacitor Cst stores charges corresponding to the voltage difference between the opposite terminals.

The first control transistor T5 and the second control transistor T6 are turned on in response to the emission control signal En supplied from the emission control line EL, during an emission period. The driving current Id according to a voltage difference between the voltage of the gate electrode of the driving transistor T1 and the first driving voltage ELVDD is generated, and thus the driving current Id is supplied to the light emitting element LD through the second control transistor T6.

According to the present embodiment, at least one of the plurality of transistors T1 to T7 includes a semiconductor layer including an oxide, and remaining transistors of the plurality of transistors T1 to T7 includes a semiconductor layer including silicon. For example, the driving transistor T1 directly exerting an influence on the brightness of the display device may be configured to include a semiconductor layer including polycrystalline silicon having high reliability, thereby implementing a higher-resolution display device. However, because the oxide semiconductor has high carrier mobility and low leakage current, the voltage drop is not significant even though the driving time is long. In other words, even when the display device operates at a low frequency, the color of an image is not significantly changed due to the voltage drop, and thus the display device may operate at the low frequency.

As such, the oxide semiconductor has a weak leakage current. Accordingly, the leakage current is prevented from flowing into the gate electrode of the driving transistor T1 while reducing power consumption, by employing at least one of the compensation transistor T3 and the first initialization transistor T4 as an oxide semiconductor.

Figure 14A:
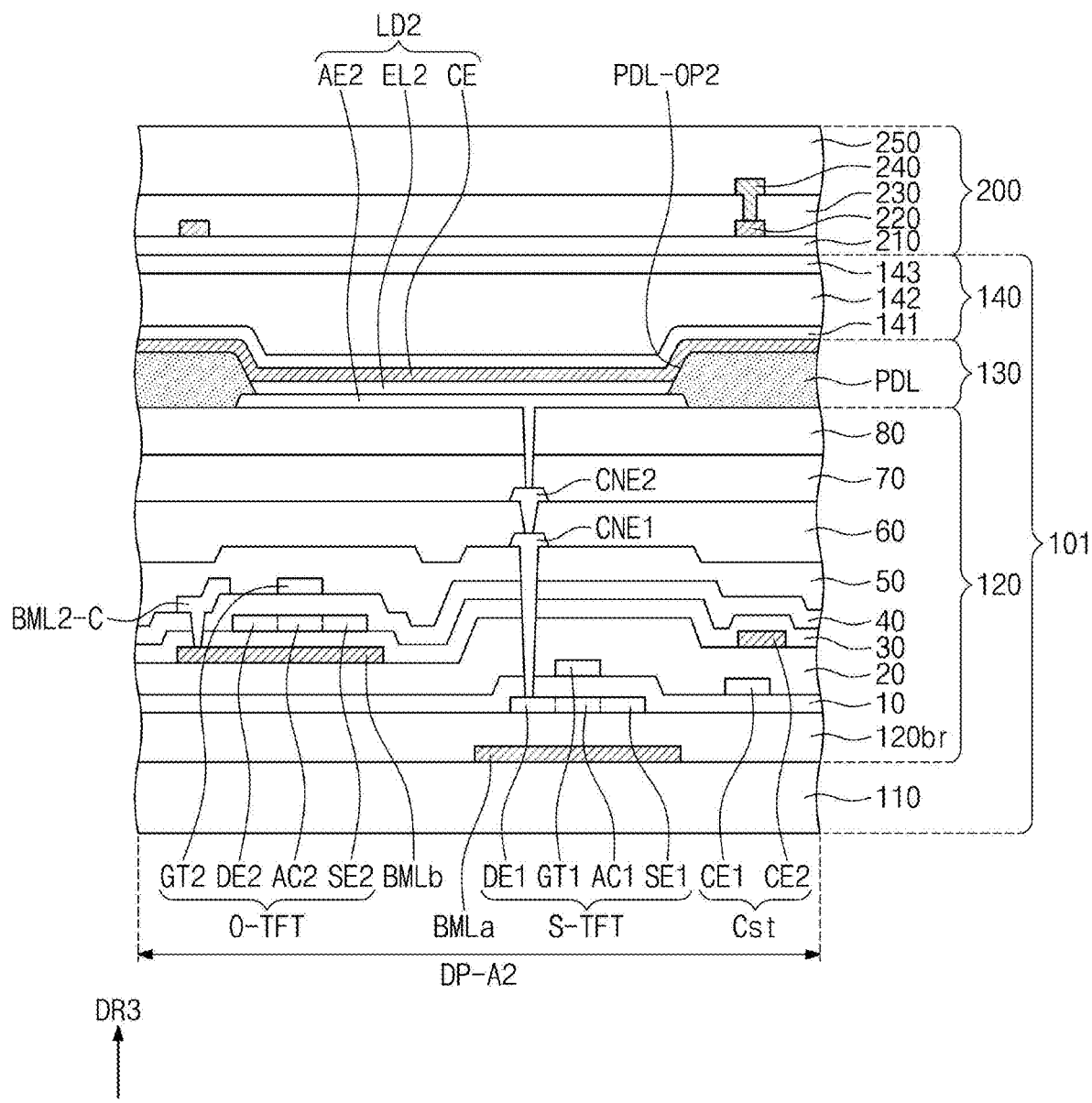
FIG. 14A is a cross-sectional view of a display module, according to an embodiment of the present disclosure.
Figure 14B:
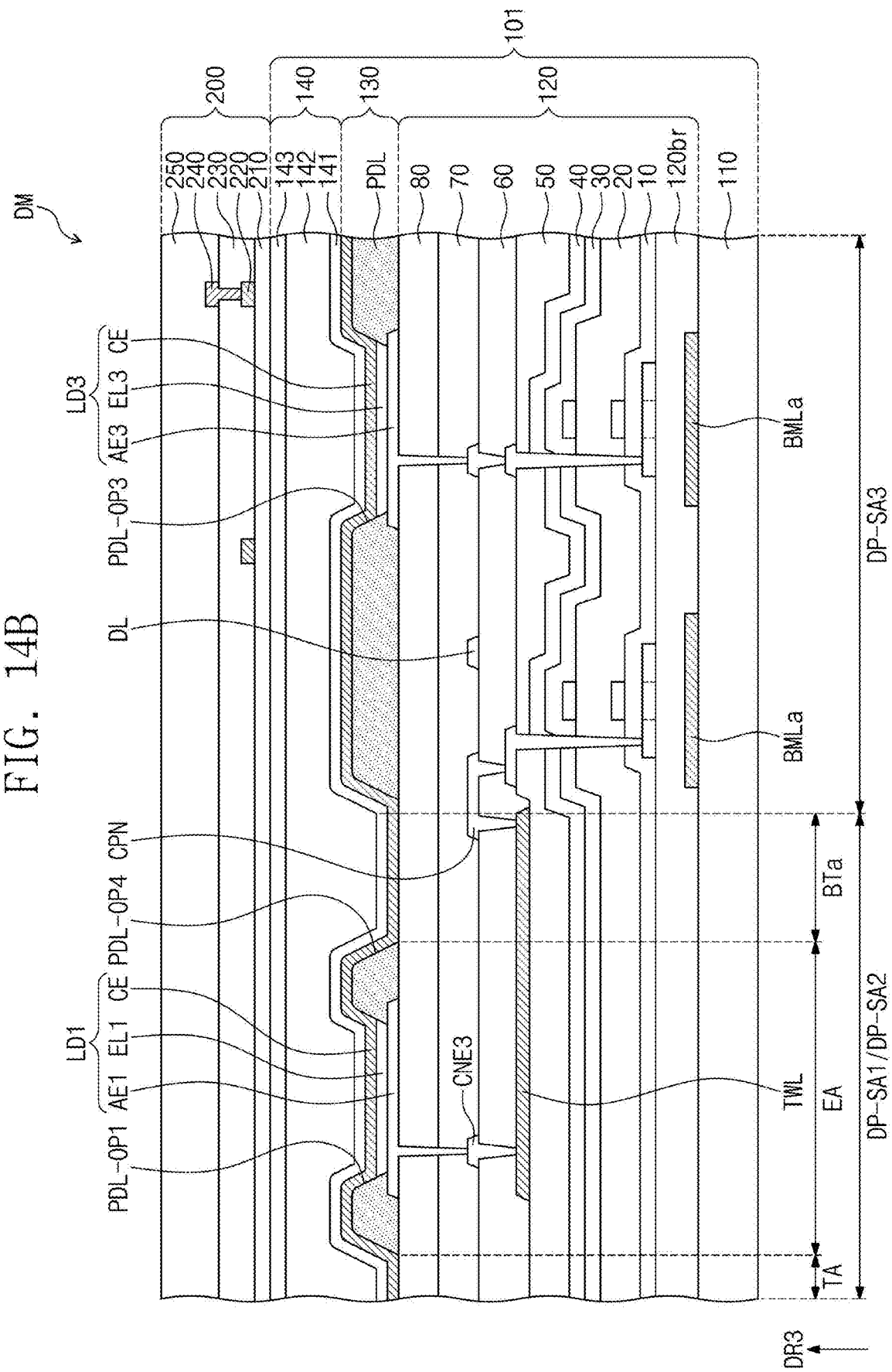
FIG. 14B is a cross-sectional view of a display module, according to an embodiment of the present disclosure.

FIG. 14A is a cross-sectional view of a display module, according to an embodiment of the present disclosure. FIG. 14B is a cross-sectional view of a display module, according to an embodiment of the present disclosure. FIG. 14A is a cross-sectional view of a portion including the second area DP-A2 shown in FIGS. 8A and 8B. FIG. 14B is a cross-sectional view of a portion including the first sub area DP-SA1 and the third sub area DP-SA3 shown in FIGS. 8A and 8B.

Referring to FIGS. 14A and 14B, the display panel 101 may include a plurality of insulating layers, a semiconductor pattern, a conductive pattern, and a signal line. An insulating layer, a semiconductor layer, and a conductive layer are formed in a coating or deposition manner. Thereafter, the insulating layer, the semiconductor layer, and the conductive layer may be selectively patterned in a photolithography manner. In such a manner, the semiconductor pattern, the conductive pattern, and the signal line included in the circuit layer 120 and the light emitting element layer 130 are formed. Afterward, the encapsulation layer 140 that covers the light emitting element layer 130 may be formed.

FIG. 14A shows the second light emitting element LD2 and a silicon transistor S-TFT of the second pixel circuit PC2 (see FIGS. 8A and 8B) and an oxide transistor O-TFT of the second pixel circuit PC2. FIG. 14B illustrates the first light emitting element LD1, the first pixel circuit PC1, the third light emitting element LD3, and the third pixel circuit PC3.

A buffer layer 120*br* may be disposed on the base layer 110. The buffer layer 120*br* may prevent metal atoms or impurities from being spread into a first semiconductor pattern. In addition, the buffer layer 120*br* may adjust the speed of applying heat during a crystallization process for forming the first semiconductor pattern, such that the first semiconductor pattern is uniformly formed.

A first back metal layer BMLa may be disposed under the silicon transistor S-TFT, and a second back metal layer BMLb may be disposed under the oxide transistor O-TFT. To protect the first to third pixel circuits PC1, PC2, and PC3, the first and second back metal layers BMLa and BMLb may overlap the first to third pixel circuits PC1, PC2, and PC3. The first and second back metal layers BMLa and BMLb may block an electric potential caused by the polarization of the base layer 110 from affecting the first to third pixel circuits PC1, PC2, and PC3.

The first back metal layer BMLa may be disposed to correspond to at least part of the pixel circuit PC (see FIG. 13). According to an embodiment of the present disclosure, the first back metal layer BMLa may overlap the driving transistor T1 (see FIG. 13) provided as the silicon transistor S-TFT.

The first back metal layer BMLa may be interposed between the base layer 110 and the buffer layer 120*br*. According to an embodiment of the present disclosure, the first back metal layer BMLa may be disposed on the base layer 110 on which an organic layer and an inorganic layer are alternately stacked. An inorganic barrier layer may be further interposed between the first back metal layer BMLa and the buffer layer 120*br*. The first back metal layer BMLa may be connected to an electrode or a wire to receive a constant voltage or a signal from the electrode or the wire. According to an embodiment of the present disclosure, the first back metal layer BMLa may be isolated from another electrode or another wire.

The second back metal layer BMLb may be disposed to correspond to a lower portion of the oxide transistor O-TFT. The second back metal layer BMLb may be interposed between a second insulating layer 20 and a third insulating layer 30. The second back metal layer BMLb may be disposed on the same layer as the second electrode CE2 of the storage capacitor Cst. The second back metal layer BMLb may be connected to a contact electrode BML2-C to receive a constant voltage or a signal. The contact electrode BML2-C may be disposed on the same layer as a gate electrode GT2 of the oxide transistor O-TFT.

Each of the first back metal layer BMLa and the second back metal layer BMLb may include a reflective metal. For example, each of the first back metal layer BMLa and the second back metal layer BMLb may include silver (Ag), an alloy containing silver (Ag), molybdenum (Mo), an alloy containing molybdenum (Mo), aluminum (Al), an alloy containing aluminum (Al), an aluminum nitride (AlN), tungsten (W), a tungsten nitride (WN), copper (Cu), titanium (Ti), and p+ doped amorphous silicon. The first back metal layer BMLa and the second back metal layer BMLb may include the same material or different materials.

A first semiconductor pattern may be disposed on the buffer layer 120*br*. The first semiconductor pattern may include a silicon semiconductor. For example, the silicon semiconductor may include amorphous silicon, or polycrystalline silicon. For example, the first semiconductor pattern may include low-temperature polysilicon.

FIG. 14A illustrates only a portion of the first semiconductor pattern disposed on the buffer layer 120*br*. The first semiconductor pattern may be further disposed in another area. The first semiconductor pattern may be arranged across pixels in a specific design rule. An electrical property of first semiconductor pattern may vary depending on whether it is doped or not. The first semiconductor pattern may include a first semiconductor area having higher conductivity and a second semiconductor area having lower conductivity. The first area may be doped with an N-type dopant or a P-type dopant. A P-type transistor may include a doping area doped with the P-type dopant, and an N-type transistor may include a doping area doped with the N-type dopant. A second semiconductor area may be a non-doped area or may be an area doped at a concentration lower than the concentration of the first semiconductor area.

The conductivity of the first semiconductor area may be higher than the conductivity of the second semiconductor area. The first semiconductor area may serve as an electrode or a signal line. The second semiconductor area may correspond to an active area (or channel) of a transistor. In other words, a portion of the semiconductor pattern may be an active area of a transistor, another portion of the semiconductor pattern may be a source area or a drain area of the transistor, and another portion of the semiconductor pattern may be a connection electrode or a connection signal line.

A source area SE1, an active area AC1, and a drain area DE1 of the silicon transistor S-TFT may be formed from the first semiconductor pattern. The source area SE1 and the drain area DE1 may extend in directions opposite to each other from the active area AC1, when viewed in a cross-sectional view. In other words, the active area AC1 may be provided between the source area SE1 and the drain area DE1.

A first insulating layer 10 may be disposed on the buffer layer 120br. The first insulating layer 10 may overlap a plurality of pixels in common and may cover the first semiconductor pattern. The first insulating layer 10 may be an inorganic layer and/or an organic layer, and may have a single-layer structure or a multi-layer structure. The first insulating layer 10 may include at least one of an aluminum oxide, a titanium oxide, a silicon oxide, a silicon nitride, a silicon oxynitride, a zirconium oxide, and a hafnium oxide. In an embodiment of the present disclosure, the first insulating layer 10 may be a single silicon oxide layer. The first insulating layer 10 and an insulating layer of the circuit layer 120, which is to be described later, may be an inorganic layer and/or an organic layer, and may have a single-layer structure or a multi-layer structure. The inorganic layer may include, but is not limited to, at least one of the above-described materials.

A gate electrode GT1 of the silicon transistor S-TFT is disposed on the first insulating layer 10. The gate electrode GT1 may be a portion of a metal pattern. The gate electrode GT1 overlaps the active area AC1 of the silicon transistor S-TFT. The gate electrode GT1 may function as a mask in a process of doping the first semiconductor pattern. The gate electrode GT1 may include, but is not limited thereto, titanium (Ti), silver (Ag), an alloy containing silver (Ag), molybdenum (Mo), an alloy containing molybdenum (Mo), aluminum (Al), an alloy containing aluminum (Al), an aluminum nitride (AlN), tungsten (W), a tungsten nitride (WN), copper (Cu), indium tin oxide (ITO), indium zinc oxide (IZO), or the like.

The second insulating layer 20 is disposed on the first insulating layer 10 and may cover the gate electrode GT1 of the silicon transistor S-TFT. The second insulating layer 20 may be an inorganic layer and/or an organic layer, and may have a single-layer structure or a multi-layer structure. The second insulating layer 20 may include at least one of silicon oxide, silicon nitride, and silicon oxynitride. In an embodiment of the present disclosure, the second insulating layer 20 may have a multi-layer structure including a silicon oxide layer and a silicon nitride layer.

The third insulating layer 30 may be disposed on the second insulating layer 20. The third insulating layer 30 may have a single-layer or multi-layer structure. For example, the third insulating layer 30 may have a multi-layer structure including a silicon oxide layer and a silicon nitride layer. The second electrode CE2 of the storage capacitor Cst may be interposed between the second insulating layer 20 and the third insulating layer 30. Moreover, the first electrode CE1 of the storage capacitor Cst may be interposed between the first insulating layer 10 and the second insulating layer 20. For example, the first electrode CE1 of the storage capacitor Cst may directly contact the first insulating layer 10.

A second semiconductor pattern may be disposed on the third insulating layer 30. The second semiconductor pattern may include an oxide semiconductor. The oxide semiconductor may include a plurality of areas that are distinguished from one another depending on whether metal oxide is reduced. An area (hereinafter referred to as a "reduction area") in which the metal oxide is reduced has higher conductivity than an area (hereinafter referred to as a "non-reduction area") in which the metal oxide is not reduced. The reduction area serves as a source area/drain area of a transistor or a signal line. The non-reduction area corresponds to an active area (alternatively, a semiconductor area or a channel) of a transistor. In other words, a portion of the second semiconductor pattern may be an active area of a transistor, another portion of the second semiconductor pattern may be a source area or a drain area of the transistor, and another portion of the second semiconductor pattern may be a signal transmission area.

A source area SE2, an active area AC2, and a drain area DE2 of the oxide transistor O-TFT may be formed from the second semiconductor pattern. The source area SE2 and the drain area DE2 may extend in directions opposite to each other from the active area AC2, when viewed in a cross-sectional view.

A fourth insulating layer 40 may be disposed on the third insulating layer 30. The fourth insulating layer 40 may overlap a plurality of pixels in common and may cover the second semiconductor pattern. The fourth insulating layer 40 may include at least one of an aluminum oxide, a titanium oxide, a silicon oxide, a silicon nitride, a silicon oxynitride, a zirconium oxide, and a hafnium oxide.

The gate electrode GT2 of the oxide transistor O-TFT is disposed on the fourth insulating layer 40. The gate electrode GT2 may be a portion of a metal pattern. The gate electrode GT2 overlaps the active area AC2. The gate electrode GT2 may function as a mask in a process of doping the second semiconductor pattern.

A fifth insulating layer 50 may be disposed on the fourth insulating layer 40 and may cover the gate electrode GT2. The fifth insulating layer 50 may be an inorganic layer and/or an organic layer, and may have a single-layer structure or a multi-layer structure.

A first connection electrode CNE1 may be disposed on the fifth insulating layer 50. The first connection electrode CNE1 may be connected to the drain area DE1 of the silicon transistor S-TFT through a contact hole penetrating the first to fifth insulating layers 10, 20, 30, 40, and 50.

A sixth insulating layer 60 may be disposed on the fifth insulating layer 50. A second connection electrode CNE2 may be disposed on the fifth insulating layer 60. The second connection electrode CNE2 may be connected to the first connection electrode CNE1 through a contact hole penetrating the sixth insulating layer 60. A seventh insulating layer 70 may be disposed on the sixth insulating layer 60 and may cover the second connection electrode CNE2. An eighth insulating layer 80 may be disposed on the seventh insulating layer 70.

Each of the sixth insulating layer 60, the seventh insulating layer 70, and the eighth insulating layer 80 may be an organic layer. For example, each of the sixth insulating layer 60, the seventh insulating layer 70, and the eighth insulating layer 80 may include general purpose polymers such as Benzocyclobutene (BCB), polyimide, Hexamethyldisiloxane (HMDSO), Polymethylmethacrylate (PMMA) or Polystyrene (PS), a polymer derivative having a phenolic group, an acrylic polymer, an imide-based polymer, an acryl ether polymer, an amide-based polymer, a fluorine-based polymer, a p-xylene-based polymer, a vinyl alcohol-based polymer, and the blend thereof.

The light emitting element layer 130 including the first to third light emitting elements LD1, LD2, and LD3 may be disposed on the circuit layer 120. The first light emitting element LD1 may include a first pixel electrode AE1, a first light emitting layer EL1, and the common electrode CE. The second light emitting element LD2 may include a second pixel electrode AE2, a second light emitting element EL2, and the common electrode CE. The third light emitting element LD3 may include a third pixel electrode AE3, a third light emitting layer EL3, and the common electrode CE. The common electrode CE may be provided in common by being connected to the first to third pixels PX1 to PX3 (see FIGS. 8A and 8B).

The first pixel electrode AE1, the second pixel electrode AE2, and the third pixel electrode AE3 may be disposed on the eighth insulating layer 80. Each of the first pixel electrode AE1, the second pixel electrode AE2, and the third pixel electrode AE3 may be a transmissive (semi-transmissive) electrode or a reflective electrode. According to an embodiment of the present disclosure, the first electrode AE1, the second pixel electrode AE2, and the third pixel electrode AE3 may include a reflective layer formed of Ag, Mg, Al, Pt, Pd, Au, Ni, Nd, Ir, Cr, or a compound thereof, and a transparent electrode or semi-transparent electrode layer formed on the reflective layer. The transparent or semi-transparent electrode layer may include at least one selected from a group including indium tin oxide (ITO), indium zinc oxide (IZO), indium gallium zinc oxide (IGZO), zinc oxide (ZnO) or indium oxide ($In_2O_3$), and aluminum-doped zinc oxide (AZO). For example, each of the first pixel electrode AE1, the second pixel electrode AE2, and the third pixel electrode AE3 may be formed of ITO/Ag/ITO.

A pixel defining layer PDL may be disposed on the eighth insulating layer 80. The pixel defining layer PDL may have a property of absorbing light. For example, the pixel defining layer PDL may have a black color. The pixel defining layer PDL may include a black coloring agent. The black coloring agent may include a black dye and a black pigment. The black coloring agent may include a metal, such as carbon black or chromium, or an oxide thereof.

The pixel defining layer PDL may be disposed in the first to third sub areas DP-SA1 to DP-SA3 and the second area DP-A2. The pixel defining layer PDL may cover a portion of each of the first to third pixel electrodes AE1, AE2, and AE3. For example, a first opening PDL-OP1 exposing a portion of the first pixel electrode AE1, a second opening PDL-OP2 exposing a portion of the second pixel electrode AE2, and a third opening PDL-OP3 exposing a portion of the third pixel electrode AE3 may be defined in the pixel defining layer PDL. The pixel defining layer PDL may further include an opening pattern PDL-OP4 disposed in the first and second sub areas DP-SA1 and DP-SA2. The opening pattern PDL-OP4 may expose transparent area BTa. In the first area DP-A1, an area overlapping the first pixel electrode AE1 may be referred to as an element area EA, and the remaining area (e.g., the area exposed by the opening pattern PDL-OP4) may be referred to as the transparent area BTa.

The first pixel electrode AE1 may be electrically connected to the first pixel circuit PC1 disposed in the third sub area DP-SA3. For example, the first pixel electrode AE1 may be electrically connected to the first pixel circuit PC1 (see FIGS. 8A and 8B) through the connection wire TWL, a connection bridge CPN and a third connection electrode CNE3. In this case, the connection wire TWL may overlap the transparent area BTa. For example, the connection wire TWL may be in the area demarcated by the opening pattern PDL-OP4. Accordingly, the connection wire TWL may include a light transmissive material.

The connection wire TWL may be interposed between the fifth insulating layer 50 and the sixth insulating layer 60, but is not particularly limited thereto. The connection bridge CPN and the third connection electrode CNE3 may be interposed between the sixth insulating layer 60 and the seventh insulating layer 70. The connection bridge CPN may be connected to the connection wire TWL and the first pixel circuit PC1. The third connection electrode CNE3 may be connected between the first pixel electrode AE1 and the connection wire TWL.

The first light emitting layer EL1 may be disposed on the first pixel electrode AE1; the second light emitting layer EL2 may be disposed on the second pixel electrode AE2; and, the third light emitting layer EL3 may be disposed on the third pixel electrode AE3. In an embodiment of the present disclosure, each of the first to third light emitting layers EL1, EL2, and EL3 may emit light of at least one color among blue, red, and green.

The common electrode CE may be disposed on the first to third light emitting layers EL1, EL2, and EL3. The common electrode CE has an integral shape and may be disposed in the first to third pixels PX1 to PX3 in common.

A hole control layer may be interposed between the first to third pixel electrodes AE1, AE2, and AE3 and the first to third light emitting layers EL1, EL2, and EL3. The hole control layer may include a hole transport layer and may further include a hole injection layer. An electron control layer may be interposed between the common electrode CE and the first to third light emitting layers EL1, EL2, and EL3. The electron control layer may include an electron transport layer and may further include an electron injection layer. The hole control layer and the electron control layer may be formed, in common, in the first to third pixels PX1 to PX3 by using an open mask.

The encapsulation layer 140 may be disposed on the light emitting element layer 130. The encapsulation layer 140 may include an inorganic layer 141, an organic layer 142, and an inorganic layer 143, which are sequentially stacked, but layers constituting the encapsulation layer 140 are not limited thereto.

The inorganic layer 141 and the inorganic layer 143 may protect the light emitting element layer 130 from moisture and oxygen, and the organic layer 142 may protect the light emitting element layer 130 from a foreign substance such as dust particles. The inorganic layer 141 and the inorganic layer 143 may include a silicon nitride layer, a silicon oxynitride layer, a silicon oxide layer, a titanium oxide layer, or an aluminum oxide layer. The organic layer 142 may include, but is not limited to, an acryl-based organic layer.

The input sensing layer 200 may be disposed on the display panel 100. The input sensing layer 200 may be referred to as a sensor, an input sensing layer, or an input sensing panel. The input sensing layer 200 may include a sensing base layer 210, a first conductive layer 220, a sensing insulating layer 230, a second conductive layer 240, and a protective layer 250.

The sensing base layer 210 may be disposed on the display panel 100. The sensing base layer 210 may be an inorganic layer including at least one of silicon nitride, silicon oxynitride, and silicon oxide. Alternatively, the sensing base layer 210 may be an organic layer including an epoxy resin, an acrylate resin, or an imide-based resin. The sensing base layer 210 may have a single-layer structure or may have a multi-layer structure stacked in the third direction DR3.

Each of the first conductive layer 220 and the second conductive layer 240 may have a single-layer structure or a multi-layer structure stacked in the third direction DR3.

A conductive layer of a single-layer structure may include a metal layer or a transparent conductive layer. The metal layer may include molybdenum, silver, titanium, copper, aluminum, or an alloy thereof. The transparent conductive layer may include a transparent conductive oxide such as indium tin oxide (ITO), indium zinc oxide (IZO), zinc oxide (ZnO), or indium zinc tin oxide (IZTO). In addition, the transparent conductive layer may include a conductive polymer such as PEDOT, metal nanowire, graphene, or the like.

A conductive layer of the multi-layer structure may include metal layers. For example, the metal layers may have a three-layer structure of titanium/aluminum/titanium. The conductive layer of the multi-layer structure may include at least one metal layer and at least one transparent conductive layer.

The sensing insulating layer 230 may be interposed between the first conductive layer 220 and the second conductive layer 240. Each of the sensing insulating layer 230 and the protective layer 250 may include an inorganic layer. The inorganic layer may include at least one of an aluminum oxide, a titanium oxide, a silicon oxide, a silicon nitride, a silicon oxynitride, a zirconium oxide, or a hafnium oxide.

Alternatively, each of the sensing insulating layer 230 and the protective layer 250 may include an organic layer. The organic layer may include at least one of acrylate-based resin, methacrylate-based resin, polyisoprene-based resin, vinyl-based resin, epoxy-based resin, urethane-based resin, cellulose-based resin, siloxane-based resin, polyimide-based resin, polyamide-based resin, and perylene-based resin.

Figure 15A:
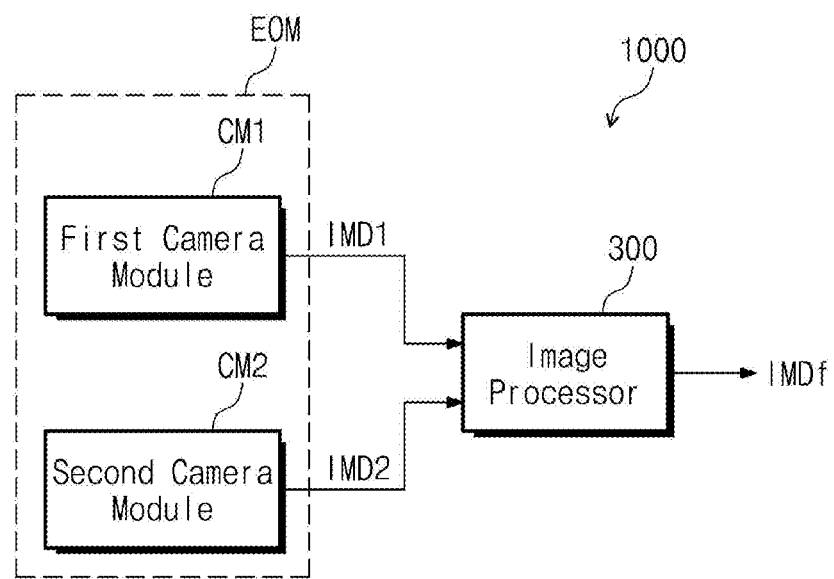
FIGS. 15A and 15B are block diagrams illustrating configurations of an electronic device, according to embodiments of the present disclosure.
Figure 15B:
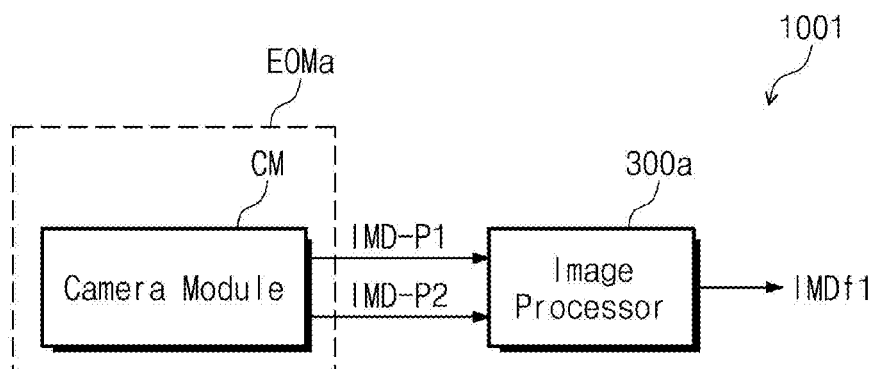

FIGS. 15A and 15B are block diagrams illustrating some configurations of an electronic device, according to embodiments of the present disclosure.

Referring to FIGS. 6A and 15A, the electronic device 1000 according to an embodiment of the present disclosure includes an electro-optical module EOM and an image processor 300 connected to the electro-optical module EOM. The electro-optical module EOM may include the plurality of camera modules CM1 and CM2. As an example, it is illustrated that the electro-optical module EOM includes two camera modules (e.g., the first and second camera modules CM1 and CM2). The number of camera modules included in the electro-optical module EOM is not limited thereto.

The image processor 300 may receive pieces of image data from the plurality of camera modules CM1 and CM2, respectively. As an example, the image processor 300 may receive first image data IMD1 from the first camera module CM1 and may receive second image data IMD2 from the second camera module CM2.

The image processor 300 may generate final image data IMDf by processing the first image data IMD1 and the second image data IMD2.

Referring to FIGS. 6B and 15B, the electronic device 1001 according to an embodiment of the present disclosure includes an electro-optical module EOMa and an image processor 300a connected to the electro-optical module EOMa. The electro-optical module EOMa may include one camera module CM. The camera module CM may include the first and second optical modules OL3 and OL4. The camera module CM may output first portion image data IMD-P1 for a first portion IS-P1 of the image sensor IS corresponding to the first optical module OL3 and second portion image data IMD-P2 for a the second portion IS-P2 of the image sensor IS corresponding to the second optical module OL4.

The image processor 300a may receive the first portion image data IMD-P1 and the second portion image data IMD-P2 from the camera module CM. The image processor 300a may generate final image data IMDf1 by processing the first portion image data IMD-P1 and the second portion image data IMD-P2.

Figure 16:
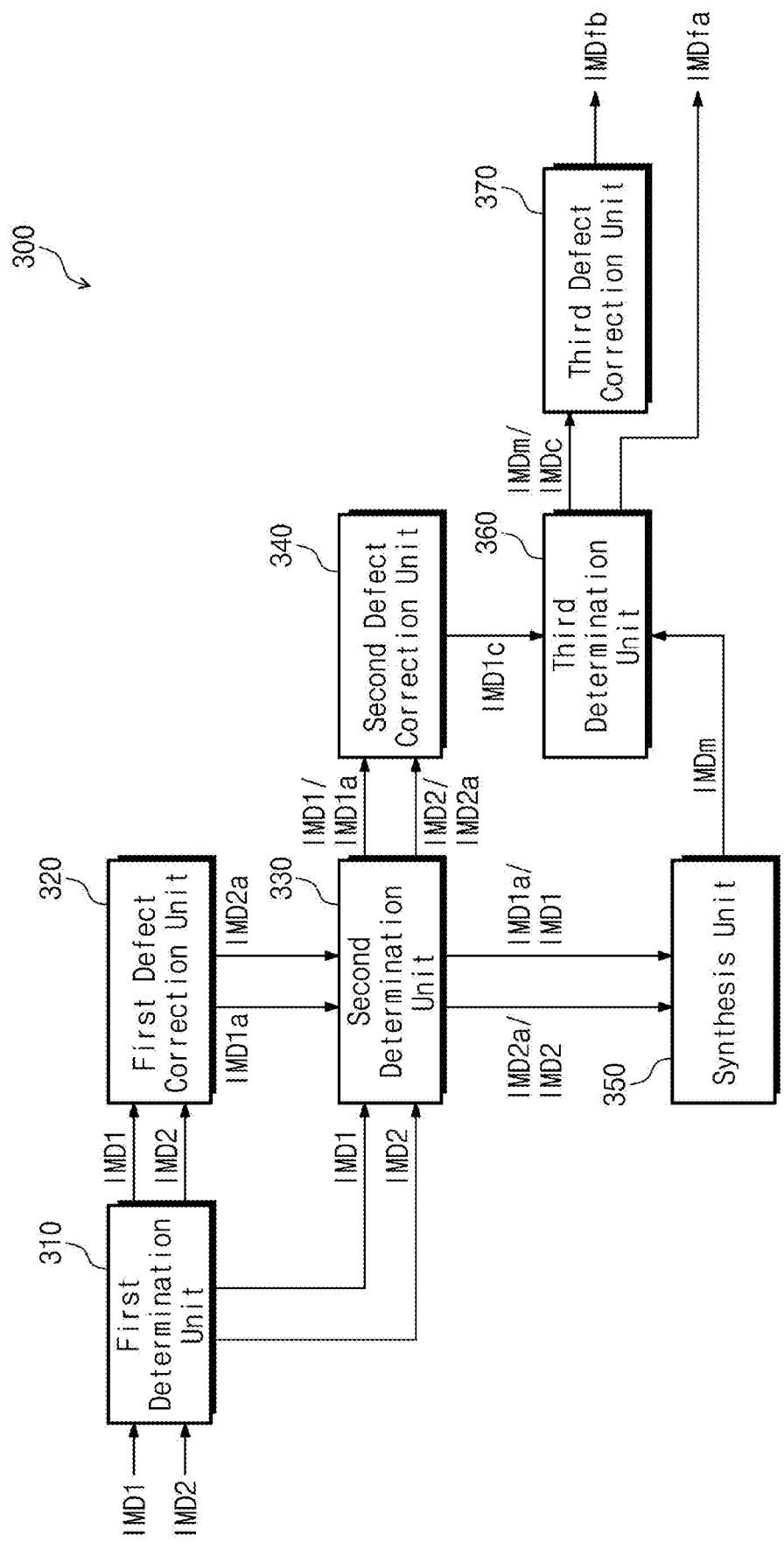
FIG. 16 is a block diagram illustrating an image processor shown in FIG. 15A.
Figure 17:
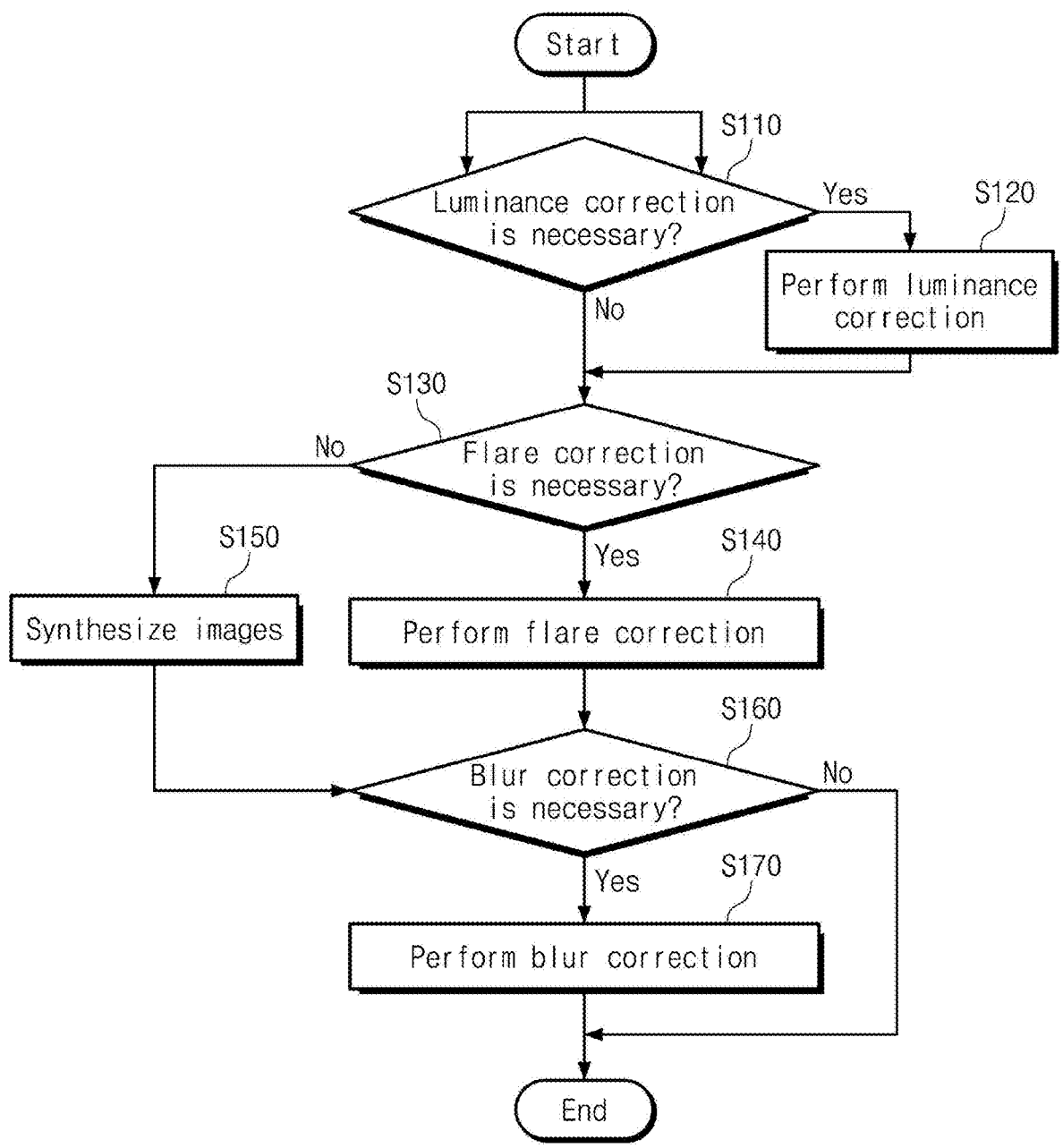
FIG. 17 is a flowchart illustrating an operating process of an image processor shown in FIG. 16.

A process of generating the final image data IMDf will be described in detail with reference to FIGS. 16 and 17. FIGS. 16 and 17 illustrate a process of processing the first image data IMD1 and the second image data IMD2. In addition, a process of processing the first portion image data IMD-P1 and the second portion image data IMD-P2 may be similarly performed. Accordingly, descriptions of the first portion image data IMD-P1 and the second portion image data IMD-P2 will be replaced by describing the process of processing the first image data IMD1 and the second image data IMD2 with reference to FIGS. 16 and 17.

FIG. 16 is a block diagram illustrating the image processor shown in FIG. 15A. FIG. 17 is a flowchart illustrating an operating process of the image processor shown in FIG. 16.

Referring to FIGS. 16 and 17, the image processor 300 may include first, second and third determination units (or circuits) 310, 330, and 360, first, second and third defect correction units (or circuits) 320, 340, and 370, and a synthesis unit 350. The number of determination units and the number of defect correction units included in the image processor 300 are not limited thereto. For example, the image processor 300 may include one or more determination units and one or more defect correction units or may include four or more determination units and four or more defect correction units. Each of the first to third determination units 310, 330 and 360 may be a hardware implementation of a circuit, each of the first, second and third defect correction units 320, 340, and 370 may be a hardware implementation of a circuit and the synthesis unit 350 may be a hardware implementation of a circuit.

The first determination unit 310 may receive the first image data IMD1 and the second image data IMD2 and then may determine whether a first defect is present in at least one of the first image data IMD1 and the second image data IMD2 (S110). In other words, the first determination unit 310 may determine if luminance correction is necessary. As an example, the first defect may be a luminance defect. For example, the first determination unit 310 may determine whether a luminance of each of first and second images IM1 and IM2 (see FIGS. 18A and 18B) respectively captured by the first and second camera modules CM1 and CM2 is lower than predetermined reference luminance, based on the first image data IMD1 and the second image data IMD2 (S110). When at least one of the first and second images IM1 and IM2 has a luminance lower than the reference luminance, the first determination unit 310 may determine that luminance correction is necessary. When at least one of the first and second images IM1 and IM2 has luminance greater than or equal to the reference luminance, the first determination unit 310 may determine that the luminance correction is not necessary.

When the determination result indicates that the luminance correction is not necessary, the first determination unit 310 may transmit the first image data IMD1 and the second image data IMD2 to the second determination unit 330. On the other hand, when the luminance correction is necessary, the first determination unit 310 may transmit the first image data IMD1 and the second image data IMD2 to the first defect correction unit 320. The first defect correction unit 320 may receive the first image data IMD1 and the second image data IMD2 and then may correct a first defect for the first image data IMD1 and the second image data IMD2. When the first defect is a luminance defect, the first defect correction unit 320 may perform luminance correction on the first image data IMD1 and the second image data IMD2 (S120). The first defect correction unit 320 may generate first correction image data IMD1a and second correction image data IMD2a by performing luminance correction on the first image data IMD1 and the second image data IMD2.

As an example, the first defect correction unit 320 generates second shift image data by performing a shift-conversion on the second image data IMD2 based on the first image data IMD1. Afterward, the first defect correction unit 320 generates the first correction image data IMD1a by synthesizing the first image data IMD1 and the second shift image data. The first defect correction unit 320 generates first shift image data by performing shift-conversion on the first image data IMD1 based on the second image data IMD2. Afterward, the first defect correction unit 320 generates the second correction image data IMD2a by synthesizing the second image data IMD2 and the first shift image data. The level of shift conversion may vary depending on a separation distance d1 (see FIG. 6A) between the first and second camera modules CM1 and CM2.

The second determination unit 330 may receive the first image data IMD1 and the second image data IMD2 from the first determination unit 310 or may receive the first correction image data IMD1a and the second correction image data IMD2a from the first defect correction unit 320. When receiving the first image data IMD1 and the second image data IMD2, the second determination unit 330 may determine whether a second defect is present in at least one of the first image data IMD1 and the second image data IMD2 (S130). As an example, a second defect could be a flare defect. In other words, the second determination unit 330 may determine if flare correction is necessary.

When there is no second defect in at least one of the first image data IMD1 and the second image data IMD2, the second determination unit 330 may transmit the first image data IMD1 and the second image data IMD2 to the synthesis unit 350. The synthesis unit 350 may output synthesis image data IMDm by synthesizing the first image data IMD1 and the second image data IMD2 (S150). When the second defect is present in at least one of the first image data IMD1 and the second image data IMD2, the second determination unit 330 may transmit the first image data IMD1 and the second image data IMD2 to the second defect correction unit 340.

When receiving the first correction image data IMD1a and the second correction image data IMD2a, the second determination unit 330 may determine whether the second defect is present in at least one of the first correction image data IMD1a and the second correction image data IMD2a (S130). In other words, the second determination unit 330 may determined if flare correction is necessary.

When there is no second defect in at least one of the first correction image data IMD1a and the second correction image data IMD2a, the second determination unit 330 may transmit the first correction image data IMD1a and the second correction image data IMD2a to the synthesis unit 350. The synthesis unit 350 may output the synthesis image data IMDm by synthesizing the first correction image data IMD1a and the second correction image data IMD2a (S150). When the second defect is present in at least one of the first correction image data IMD1a and the second correction image data IMD2a, the second determination unit 330 may transmit the first correction image data IMD1a and the second correction image data IMD2a to the second defect correction unit 340.

When receiving the first image data IMD1 and the second image data IMD2, the second defect correction unit 340 may correct the second defect for the first image data IMD1 and the second image data IMD2. When the second defect is a flare defect, the second defect correction unit 340 may perform flare correction on the first image data IMD1 and the second image data IMD2 (S140). The second defect correction unit 340 may generate third correction image data IMDc (e.g., intermediate image data) by performing flare correction on the first image data IMD1 and the second image data IMD2. As an example, the second defect correction unit 340 may perform flare correction on the first image data IMD1 and the second image data IMD2 by using a double DIP algorithm. For example, by using the double DIP algorithm, the second defect correction unit 340 may separate a first image corresponding to first image data into a first flare layer and a first image layer and may separate a second image corresponding to second image data into a second flare layer and a second image layer. Afterward, the second defect correction unit 340 may generate the third correction image data IMDc, from which a flare is removed by using the first and second image layers.

When receiving the first correction image data IMD1a and the second correction image data IMD2a, the second defect correction unit 340 may correct the second defect for the first correction image data IMD1a and the second correction image data IMD2a. When the second defect is a flare defect, the second defect correction unit 340 may perform flare correction on the first correction image data IMD1a and the second correction image data IMD2a (S140). The second defect correction unit 340 may generate the third correction image data IMDc (e.g., intermediate image data) by performing flare correction on the first correction image data IMD1a and the second correction image data IMD2a.

The third determination unit 360 may receive the synthesis image data IMDm from the synthesis unit 350 or may receive the third correction image data IMDc from the second defect correction unit 340. The third determination unit 360 may determine whether a third defect is present in the synthesis image data IMDm or the third correction image data IMDc (S160). As an example, the third defect may be a blur defect. In other words, the third determination unit 360 may determine if blur correction is necessary.

When there is no third defect in the synthesis image data IMDm or the third correction image data IMDc, the third determination unit 360 may output the synthesis image data IMDm or the third correction image data IMDc as first final image data IMDfa. When the third defect is present in the synthesis image data IMDm or the third correction image data IMDc, the third determination unit 360 may transmit the synthesis image data IMDm or the third correction image data IMDc to the third defect correction unit 370.

The third defect correction unit 370 may perform blur correction on the synthesis image data IMDm or the third correction image data IMDc (S170). The third defect correction unit 370 may generate second final image data IMDfb by performing blur correction on the synthesis image data IMDm or the third correction image data IMDc.

The final image data IMDf illustrated in FIG. 15A may be the first final image data IMDfa or the second final image data IMDfb.

Figure 18A:
FIGS. 18A and 18B are diagrams illustrating first and second images, which are captured by first and second camera modules, and each of the first and second images has low luminance.
Figure 18B:
Figure 18C:
FIG. 18C is a diagram illustrating a luminance correction image obtained by performing luminance correction on the first and second images shown in FIGS. 18A and 18B.
Figure 19:
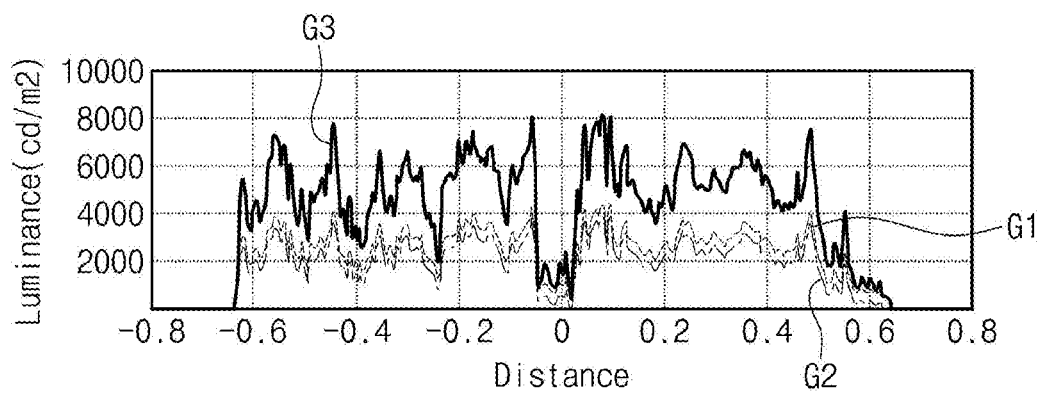
FIG. 19 is a graph illustrating luminance of each of the first image, the second image, and the luminance correction image, which are shown in FIGS. 18A to 18C, depending on a distance.

FIGS. 18A and 18B are diagrams illustrating first and second images, which are captured by first and second camera modules, and each of the first and second images has low luminance. FIG. 18C is a diagram illustrating a luminance correction image obtained by performing luminance correction on the first and second images shown in FIGS. 18A and 18B. FIG. 19 is a graph illustrating luminance of each of the first image, the second image, and the luminance correction image, which are shown in FIGS. 18A to 18C, depending on a distance.

Referring to FIGS. 6A, 18A, and 18B, each of the first image IM1 captured from the first camera module CM1 and the second image IM2 captured from the second camera module CM2 may have lower luminance than reference luminance. In this case, when luminance correction is performed on the first and second images IM1 and IM2 through the first defect correction unit 320 shown in FIG. 16, a luminance correction image IMa shown in FIG. 18C may be generated.

In FIG. 19, a first graph G1 indicates luminance according to a distance of the first image IM1 (see FIG. 18A), and a second graph G2 indicates luminance according to a distance of the second image IM2 (see FIG. 18B). A third graph G3 indicates luminance according to a distance of the luminance correction image IMa (see FIG. 18C). Even though both the first and second images IM1 and IM2 have low luminance, the luminance correction image IMa generated by performing luminance correction based on the first and second images IM1 and IM2 may have a luminance higher than that of each of the first and second images IM1 and IM2. For example, the luminance correction image IMa may be generated by performing a shift conversion on the second image IM2 by a distance deviation between the first and second images IM1 and IM2 and then by adding the luminance of the first image IM1 and the luminance of the second image IM2.

Figure 20A:
FIGS. 20A and 20B are diagrams illustrating first and second images, which are captured through first and second camera modules, and each of the first and second images has a flare defect.
Figure 20B:
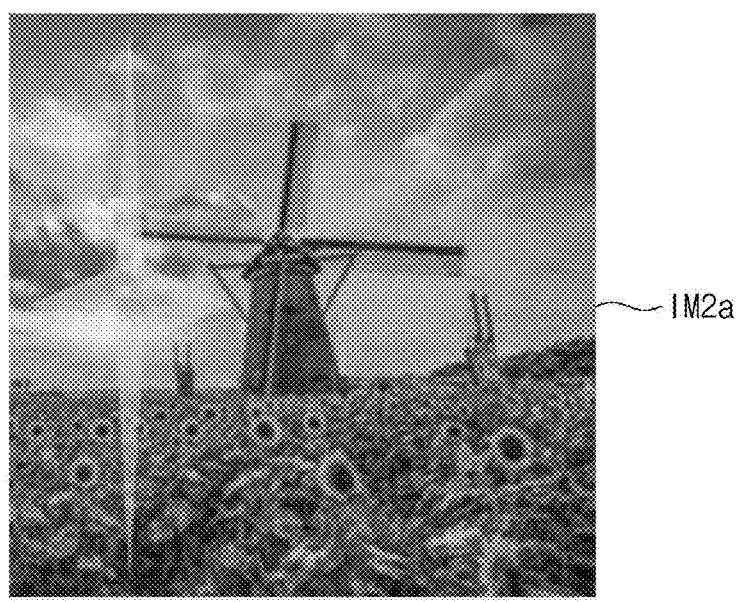
Figure 20C:
FIG. 20C is a diagram illustrating an intermediate image from which a flare defect is removed by combining the first and second images shown in FIGS. 20A and 20B.
Figure 20D:
FIG. 20D is a view illustrating a final image obtained by removing blur defects from the intermediate image shown in FIG. 20C.

FIGS. 20A and 20B are diagrams illustrating first and second images, which are captured through first and second camera modules, and each of the first and second images has a flare defect. FIG. 20C is a diagram illustrating an intermediate image, from which a flare defect is removed by combining the first and second images shown in FIGS. 20A and 20B. FIG. 20D is a view illustrating a final image obtained by removing blur defects from the intermediate image shown in FIG. 20C.

Referring to FIGS. 6A, 20A, and 20B, a flare defect may be present in a first image IM1a captured from the first camera module CM1 and a second image IM2a captured from the second camera module CM2. In this case, a location where a flare has occurred in the first image IM1a may be different from a location where a flare has occurred in the second image IM2a. As the separation distance d1, which is shown in FIG. 6A, between the first and second camera modules CM1 and CM2 increases, the deviation in a flare location between the first and second images IM1a and IM2a may increase.

When flare locations between the first and second images IM1a and IM2a are different from one another, the flare of the first image IM1a may be corrected based on the second image IM2a, and the flare of the second image IM2a may be corrected based on the first image IM1a. Accordingly, when the flare-corrected first and second images IM1a and IM2a are combined, an intermediate image IMc, from which a flare is removed as shown in FIG. 20C, may be generated.

Afterward, when a blur is present in the intermediate image IMc, a final image IMf from which a blur is removed by performing blur correction may be generated through the third defect correction unit 370 (see FIG. 16). Accordingly, the final image IMf may be an image from which a luminance defect, a flare defect, and a blur defect are removed.

FIGS. 16 to 20D illustrate only the luminance defect, the flare defect, and the block defect. However, the present disclosure is not limited thereto. In addition to these defects, the image processor 300 according to an embodiment of the present disclosure may perform additional correction on defects that occur in images captured by the camera modules CM1 and CM2.

As such, when the plurality of camera modules CM1 and CM2 (see FIG. 2) for receiving an optical signal passing through the display area 100A (see FIG. 2) are positioned in the electronic device 1000, since a defect is efficiently corrected by using the first image data IMD1 and the second image data IMD2 respectively received from the plurality of camera modules CM1 and CM2, the final image IMf having improved image quality may be generated as compared to the first and second images IMa and IMb.

Moreover, when an optical module is divided into a plurality of optical modules even though the one camera module CM (see FIG. 6B) is positioned in the electronic device 1001, the same effect as including the plurality of camera modules CM1 and CM2 may be achieved. In other words, as a defect is efficiently corrected by using the first portion image data IMD-P1 (see FIG. 15B) and the second portion image data IMD-P2 (see FIG. 15B), a final image having improved image quality may be generated as compared with the first and second portion images.

According to an embodiment of the present disclosure, as compared to an individual image, a final image with improved image quality may be generated by disposing a plurality of camera modules receiving optical signals passing through a display area on an electronic device, and synthesizing individual images after defects of the individual images captured by respective camera modules are efficiently corrected by using pieces of image data received from each of a plurality of camera modules.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An electronic device, comprising:
a display panel including a display area and a peripheral area adjacent to the display area; and
an electro-optical module disposed under the display panel,
wherein the display area includes a first area and a second area adjacent to the first area, and
wherein the electro-optical module includes a plurality of camera modules, and each of the plurality of camera modules receives an optical signal passing through the first area and overlaps the first area,
wherein the electronic device further includes:
an image processor configured to receive pieces of image data from the plurality of camera modules and to generate final image data by synthesizing the pieces of image data, wherein the image processor includes:
a first determination circuit configured to determine whether a first defect is present in the pieces of image data;
a first defect correction circuit configured to generate pieces of correction image data by correcting the first defect for each of the pieces of image data, when the first defect is present;
a second determination circuit configured to determine whether a second defect is present in the pieces of correction image data; and
a second defect correction circuit configured to remove the second defect by combining the pieces of correction image data and generate intermediate image data, when the second defect is present.

2. The electronic device of claim 1, wherein the plurality of camera modules include:
a first camera module corresponding to a first sub area in the first area; and
a second camera module corresponding to a second sub area in the first area.

3. The electronic device of claim 2, wherein the second area has first light transmittance,
wherein the first sub area has second light transmittance higher than the first light transmittance, and
wherein the second sub area has third light transmittance higher than the first light transmittance.

4. The electronic device of claim 3, wherein the second light transmittance is identical to the third light transmittance.

5. The electronic device of claim 3, wherein the second light transmittance is higher than the third light transmittance.

6. The electronic device of claim 2, wherein the display panel includes:
a plurality of first pixels disposed in the first sub area and the second sub area; and
a plurality of second pixels disposed in the second area,
wherein each of the first pixels includes:
a first light emitting element; and
a first pixel circuit configured to drive the first light emitting element, and
wherein each of the second pixels includes:
a second light emitting element; and
a second pixel circuit configured to drive the second light emitting element.

7. The electronic device of claim 6, wherein the first area further includes:
a third sub area adjacent to the first sub area and the second sub area,
wherein the display panel further includes:
a plurality of third pixels disposed in the third sub area, and
wherein the first pixel circuit of each of the first pixels is disposed in the third sub area.

8. The electronic device of claim 2, wherein the display panel includes:
a plurality of first pixels disposed in the first sub area;
a plurality of second pixels disposed in the second area; and
a plurality of third pixels disposed in the second sub area,
wherein each of the first pixels includes:
a first light emitting element; and
a first pixel circuit configured to drive the first light emitting element,
wherein each of the second pixels includes:
a second light emitting element; and
a second pixel circuit configured to drive the second light emitting element,
wherein each of the third pixels includes:
a third light emitting element; and
a third pixel circuit configured to drive the third light emitting element, and
wherein at least one of the first pixel circuits is disposed in the second sub area.

9. The electronic device of claim 2, wherein the first camera module includes:
a first image sensor; and
a first optical module interposed between the first image sensor and the display panel, and
wherein the second camera module includes:
a second image sensor; and
a second optical module interposed between the second image sensor and the display panel.

10. The electronic device of claim 2, wherein an interval between the first camera module and the second camera module is greater than a reference interval and is less than twice a width of each of the first camera module and the second camera module.

11. The electronic device of claim 10, wherein the reference interval is about 1.5 micrometer.

12. An electronic device, comprising:
a display panel including a display area and a peripheral area adjacent to the display area; and
an electro-optical module disposed under the display panel,
wherein the display area includes a first area and a second area adjacent to the first area, and
wherein the electro-optical module includes a camera module overlapping the first area and configured to receive an optical signal passing through the first area, and
wherein the camera module includes:
an image sensor overlapping the first area; and
a plurality of optical modules overlapping the image sensor,
wherein the electronic device further includes:
an image processor configured to receive image data from the camera module and to generate final image data by synthesizing pieces of portion image data, which respectively correspond to the plurality of optical modules, from among the image data,
wherein the image processor includes:
a first determination circuit configured to determine whether a first defect is present in the pieces of portion image data;
a first defect correction circuit configured to generate pieces of correction image data by correcting the first defect for each of the pieces of portion image data, when the first defect is present;
a second determination circuit configured to determine whether a second defect is present in the pieces of correction image data; and
a second defect correction circuit configured to remove the second defect by combining the pieces of correction image data and generate intermediate image data. when the second defect is present.

13. The electronic device of claim 12, wherein the plurality of optical modules include:
a first optical module corresponding to a first sub area in the first area; and
a second optical module corresponding to a second sub area in the first area.

14. The electronic device of claim 13, wherein the second area has first light transmittance,
wherein the first sub area has second light transmittance higher than the first light transmittance, and
wherein the second sub area has third light transmittance higher than the first light transmittance.

15. The electronic device of claim 14, wherein the second light transmittance is identical to the third light transmittance.

16. The electronic device of claim 14, wherein the second light transmittance is higher than the third light transmittance.

17. The electronic device of claim 13, wherein the display panel includes:
a plurality of first pixels disposed in the first sub area and the second sub area; and
a plurality of second pixels disposed in the second area,
wherein each of the first pixels includes:
a first light emitting element; and
a first pixel circuit configured to drive the first light emitting element, and
wherein each of the second pixels includes:
a second light emitting element; and
a second pixel circuit configured to drive the second light emitting element.

18. The electronic device of claim 17, wherein the first area further includes:
a third sub area surrounding the first sub area and the second sub area, and
wherein the display panel further includes:
a plurality of third pixels disposed in the third sub area,
wherein the first pixel circuit of each of the first pixels is disposed in the third sub area.

19. An image processing method of an electronic device including a display panel, which includes a display area including a first area and a second area adjacent to the first area and a peripheral area adjacent to the display area, and a plurality of camera modules overlapping the first area, the method comprising:
generating, by the plurality of camera modules, pieces of image data by receiving an optical signal passing through the first area; and
receiving pieces of image data from the plurality of camera modules through an image processor, respectively and generating final image data by synthesizing the pieces of image data,
wherein the generating of the final image data includes:
determining whether a first defect is present in the pieces of image data;
when the first defect is present, generating pieces of correction image data by correcting the first defect for each of the pieces of image data;
determining whether a second defect is present in the pieces of correction image data; and
when the second defect is present, removing the second defect by combining the pieces of correction image data and generating intermediate image data.

20. The method of claim 19, wherein the determining of whether the first defect is present includes:
comparing a luminance of a first image corresponding to a first image data and a luminance of a second image corresponding to a second image data with reference luminance; and
when at least one of the luminance of the first image and the luminance of the second image is lower than the reference luminance, determining that the first defect is present.

21. The method of claim 20, wherein the determining of whether the second defect is present includes:
determining whether a flare is present in at least one of the first image and the second image.

22. The method of claim 19, further comprising:
receiving the intermediate image data, from which the second defect is removed, and determining whether a third defect is present in the intermediate image data; and
when the third defect is present, generating the final image data by removing the third defect from the intermediate image data.

* * * * *